(12) United States Patent
Mizes

(10) Patent No.: US 7,090,324 B2
(45) Date of Patent: Aug. 15, 2006

(54) SYSTEM AND METHODS FOR COMPENSATING FOR STREAKS IN IMAGES

(75) Inventor: Howard A. Mizes, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 277 days.

(21) Appl. No.: 10/739,177

(22) Filed: Dec. 19, 2003

(65) Prior Publication Data

US 2005/0134623 A1 Jun. 23, 2005

(51) Int. Cl.
*B41J 29/393* (2006.01)

(52) U.S. Cl. ....................................... 347/19
(58) Field of Classification Search ................ 347/19
See application file for complete search history.

(56) References Cited

U.S. PATENT DOCUMENTS 4,553,033 A 11/1985 Hubble, III et al. ........ 347/251
6,819,352 B1 * 11/2004 Mizes et al. ................ 347/240
2002/0075379 A1 6/2002 Klassen et al. ............. 250/353
2005/0099446 A1 * 5/2005 Mizes et al. .................. 347/19

* cited by examiner

Primary Examiner—K. Feggins
Assistant Examiner—Julian D. Huffman
(74) Attorney, Agent, or Firm—Oliff & Berridge, PLC

(57) ABSTRACT

Defects in an image forming system may give rise to visible streaks, or one-dimensional defects in an image that run parallel to the process direction. One known method for compensating for streaks introduces a separate tone reproduction curve for each pixel column in the process direction. A compensation pattern according to this invention has alignment marks before and after a halftone compensation region. The alignment marks provide alignment between the printer pixel grid and a scanning pixel grid. The line width of each alignment mark and the gray level in each pixel column of each gray level portion is measured and analyzed to produce a local tone reproduction curve for each pixel column and associated line width. The line widths of the alignment marks can be remeasured to adjust the local tone reproduction curves to compensate for the streak defect when printing.

34 Claims, 13 Drawing Sheets

SYSTEM AND METHODS FOR COMPENSATING FOR STREAKS IN IMAGES

BACKGROUND OF THE INVENTION

1. Field of Invention

This invention relates to systems and methods for reducing print defects in electrostatically formed images.

2. Description of Related Art

Defects in the subsystems of a xerographic, electrophotographic or similar image forming system, such as a laser printer, digital copier or the like, may give rise to visible streaks in a printed image. Streaks are primarily one-dimensional defects in an image that run parallel to the process direction. Typical defects might arise from a non-uniform LED imager, contamination of the high voltage elements in a charger, scratches in the photoreceptor surface, etc. In a uniform patch of gray, streaks and bands may appear as a variation in the gray level. In general, "gray" refers to the intensity value of any single color separation layer, whether the toner is black, cyan, magenta, yellow or some other color.

One method of reducing such streaks is to design and manufacture the critical parameters of the marking engine subsystems to tight specifications. Often though, such precision manufacturing will prove to be cost prohibitive.

A tone reproduction curve (TRC) may be measured by printing patches of different bitmap area coverage. In some digital image processing applications, the reflectivity of a patch of gray is measured with a toner area coverage sensor. The manner of operation of the toner area coverage sensor is described in U.S. Pat. No. 4,553,033, which is incorporated herein by reference in its entirety. Toner area coverage sensors are typically designed with an illumination beam much larger than the halftone screen dimension. This large beam does not provide the resolution for the toner area coverage sensor to be useful as a sensor for the narrow streaks that may occur for poorly performing subsystems.

U.S. patent application Ser. No. 09/738,573 by Klassen et al, incorporated herein by reference in its entirety, discloses one exemplary embodiment of a method for compensating for streaks by introducing a separate tone reproduction curve for each pixel column in the process direction. A compensation pattern is printed and then scanned to first measure the ideal tone reproduction curve and then detect and measure streaks. The tone reproduction curves for the pixel columns associated with the streak are then modified to compensate for the streak.

SUMMARY OF THE DISCLOSURE

In implementing the methods and systems disclosed in the 573 application, the inventors of this invention discovered additional problems that need to be solved before the streaks could be acceptably compensated for. For example, for very narrow streaks, any misalignment greater than half a pixel between 1) a scanner pixel grid used to measure the compensation pattern, and 2) the pixel grid of the image forming device that printed the compensation pattern, prevents proper compensation of the streak. Additionally, properly adjusting the tone reproduction curve typically requires a greater gray level resolution in halftone intensity than is often available. Furthermore, noise in the scanning and printing process makes it difficult to adequately calibrate the streak defects in a single iteration of the compensation process.

This invention provides systems and methods that compensate for pixel misalignment between a scanning grid and the pixel grid of the image forming system.

This invention separately provides a compensation pattern that is not affected by misalignments between a scanner pixel and a printing pixel grid.

This invention separately provides systems and methods for determining tone reproduction curve compensation values based on a metric sensed from processing an image of process control marks in a compensation pattern.

This invention separately provides systems and methods that reduce the effects of halftone spatial period and scanner noise on the compensation process.

In various exemplary embodiments, systems and methods according to this invention compensate for pixel grid misalignment, by introducing a compensation pattern, which is scanned on an image capture device, such as, for example, a flatbed scanner, that has process control marks and/or alignment marks before and/or after a halftone strip that extends across a process direction. The alignment marks provide alignment between the printer pixel grid and the scanning pixel grid. The process control marks allow changes in the printer response to be more easily and/or readily detected, so that, in response to changes on the process control marks, the selected local tone reproduction curve used for a given pixel location can be changed appropriately.

In various exemplary embodiments, the alignment marks and the process control marks are the same marks.

In various exemplary embodiments, systems and methods according to this invention measure a metric from the scanned image of single pixel wide lines between each use and adjust the tone reproduction curves to compensate for streaks.

In various exemplary embodiments, systems and methods according to this invention reduce noise effects by averaging the toner density measurements of all the pixels in the halftone compensation region identified as being in a specific pixel column by the alignment process.

In various exemplary embodiments, systems and methods according to this invention are implemented using two or more iterations. After manufacture or during maintenance, a compensation pattern, having alignment marks and process control marks before and/or after a halftone compensation region, is printed by the printing system and then scanned on a flatbed scanner or other image capture device. A metric from the scanned image of the process control marks is then obtained. The gray level in each pixel column of each patch or section of the gray level sweep of the halftone compensation region is also measured. Then, the measured line widths of the process control marks and the measured gray levels are correlated and interpolated to produce a local tone reproduction curve for each pixel column and associated line width.

Subsequently, at regular intervals during printing, the process control marks are printed and measured. If there is any change in the metric obtained from the scanned image of such process control marks, the compensation data from all the columns is used to modify the local tone reproduction curve for that pixel column.

These and other features and advantages of this invention are described in, or are apparent from, the following detailed description of various exemplary embodiments of systems and methods according to this invention.

BRIEF DESCRIPTION OF THE DRAWINGS

Various exemplary embodiments of systems and methods according to this invention will be described in detail, with reference to the following figures, wherein.

DETAILED DESCRIPTION OF EXEMPLARY EMBODIMENTS

The compensation technique described herein can be applied to both color and monochrome image forming devices. The following exemplary embodiments are directed to generating and applying compensation parameters to monochrome image forming devices. However, as is well known in the art, color image forming devices operate by overlaying different color separation layers, i.e., differently colored monochrome images. Accordingly, each color separation layer can be individually compensated for using the techniques described herein. As used herein, the term "gray" indicates the amount of coverage of material between zero and 100% density on the printed surface, although in general this material may be colored any desired color.

An input gray level is typically an integer between 0 and 255 that is sent to the marking engine from a computer, an input scanner or other image data source. An actual gray level is the response of a sensor measuring the gray level of the printed image. The actual gray level can be a function of distance in the cross process direction. The desired gray level is defined as the response of the sensor to what the marking engine was designed to print. The desired gray level is independent of position for a uniform gray strip, and, for example, can be the average of all the actual gray levels. The desired gray level can also be a target value that the marking engine is designed to print.

The desired gray level, as a function of the input gray level, defines an intended tone reproduction curve. The actual gray level as a function of the input gray level defines a local tone reproduction curve. A local tone reproduction curve exists for each pixel location in the printed image in the cross-process direction. Thus, for example, a 600-spi printer that is 11 inches wide would have one desired tone reproduction curve and 6600 (600×11) local tone reproduction curves, one for each of the 6600 different pixel locations.

Figure 1:
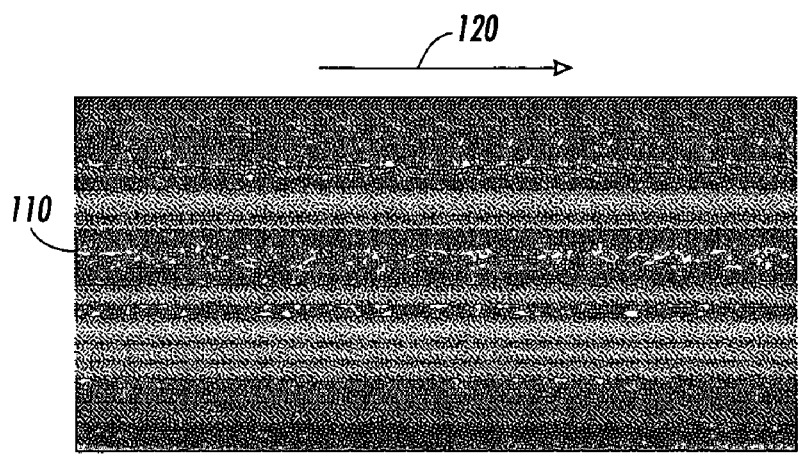
FIG. 1 illustrates an image that contains streak print defects.

FIG. 1 illustrates an image patch having a single gray level value that contains a number of streak defects. Each streak defect extends along a process or slow-scan direction, while the various different streak defects are adjacent to each other along a cross-process or fast-scan direction. That is, FIG. 1 shows a printed uniform patch of gray 110 that contains streaks. As shown in FIG. 1, the streaks run parallel to the process direction 120. The magnitude of the streaking or the difference in toner intensity is a function of position parallel to the process direction. All pixels in a column that is parallel to the process direction and that is a given distance from a reference location will experience a same shift in intensity due to the streak defect.

In various exemplary embodiments, systems and methods according to this invention compensate for streaks or improper toner density regions that run the length of the process direction and have a constant lighter or darker intensity than adjacent regions of the same intended intensity.

Figure 2:
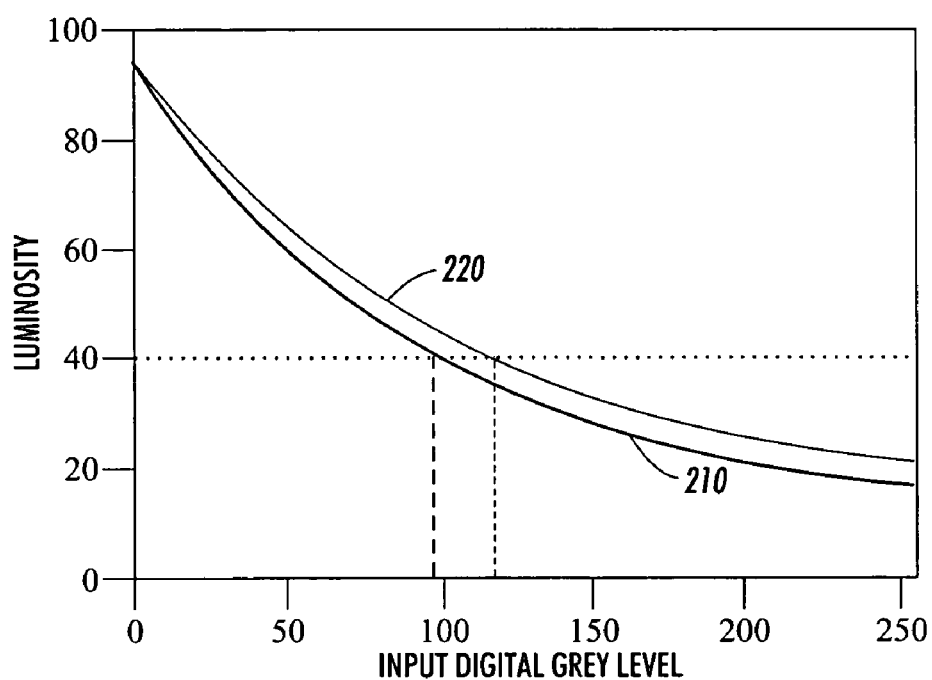
FIG. 2 is a graph illustrating an ideal tone reproduction curve and an actual toner reproduction response for a single pixel location along the cross-process direction.

FIG. 2 is a graph of several curves that show luminosity, a measure of the printed toner density, as a function of the input gray level. The ideal or intended tone reproduction curve 210 indicates the output luminosity as a function of input gray level in all pixel columns if no streak defects are present. The actual tone reproduction curve 220 is an example of actual output luminosity as a function of input gray level for a pixel column which experiences a streak defect.

That is, FIG. 2 shows a typical plot of the actual gray level for one local reproduction curve 220. If the printer response at this pixel were accurate, the plot of the actual gray level would match the plot of the ideal or intended tone reproduction curve 210 at all positions. Deviations of this local tone reproduction curve 220 from the ideal or intended tone reproduction curve 210 quantify the degree of streaking for this pixel location at all gray levels. Based on the ideal tone reproduction curve 210, if an image portion having a gray level output of 40 is desired, under ideal conditions, to obtain the desired gray level output at this pixel location, a xerographic or electrographic image forming system would need to print that image portion at a gray level of 117. Based on the actual tone reproduction curve 210, if the image portion having a gray level output of 40 is desired, to obtain the desired gray level output at this pixel location, the xerographic or electrographic image forming system would need to print that image portion at a gray level of 97. That is, the image data defining that image portion should be changed to instruct the xerographic or electrographic image forming system to print that image portion at a gray level of 97 at that pixel location. In practice, some parametrization of the two tone reproduction curves 210 and 220 shown in FIG. 2 is stored in memory and is used to modify the gray level defined by the image data for any gray level for this pixel location to achieve the desired gray level in the printed image portion.

In various exemplary embodiments, to compensate for the streak defects, the input gray level is changed using different local tone reproduction curves, where one local tone reproduction curve exists for each pixel in the cross-process direction, so that the actual gray level matches the desired gray level at every pixel location. This requires the ability to accurately determine the actual gray level at every pixel location in the cross-process direction. Spatial non-uniformities in a sensor may cause a discrepancy between the pixel location where the sensor measuring system or image forming system thinks the image is being measured at and the pixel location where the measurement is actually occurring. If this error occurs, then the compensation will be applied to the wrong pixel location. As a result, narrow streaks, such as the one illustrated in FIGS. 3 and 4, will not be properly compensated for.

In the example shown in FIG. 2, to achieve a constant luminosity of 40, the input gray level value for the pixel location experiencing the streak defect must be lowered to a value 97 from the value 117 that was determined using the ideal tone reproduction curve. In the methods and systems of the 573 application, the input gray level is adjusted for each pixel by multiplying the input gray level for that pixel by a compensation parameter that is selected depending on the pixel location and the input level. The ideal tone reproduction curve is then applied to the compensated input image or gray level value to convert from the input gray level value to the printer dependant gray level value.

Figure 4:
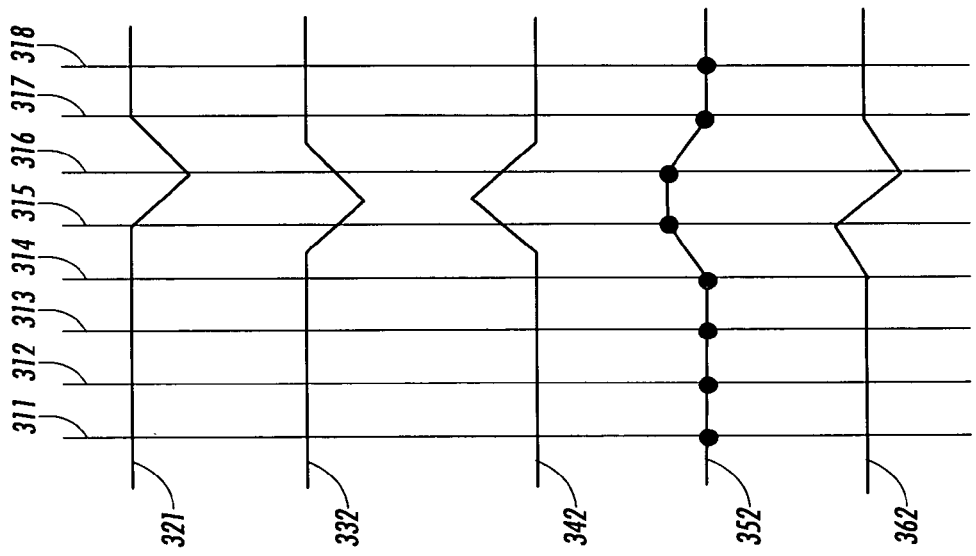
FIGS. 3 and 4 graphically illustrate the effect of a half-pixel misalignment on the streak defect compensation.
Figure 3:
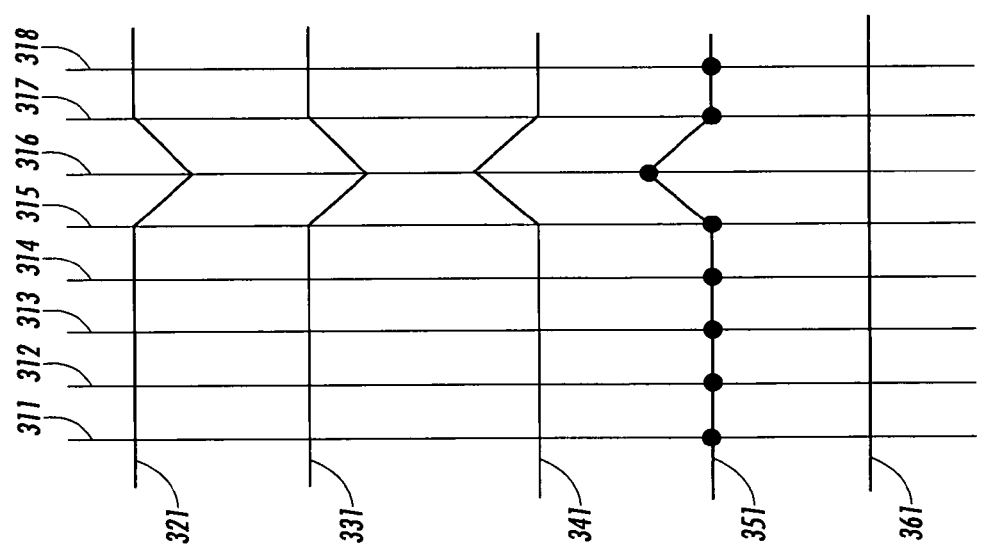

FIG. 3 and FIG. 4 graphically illustrate several curves that demonstrate streak compensation with proper and improper pixel alignment between the printer pixel grid and the pixel grid in the compensation data. The actual printed toner density values 321 shown in FIG. 3 and FIG. 4 are generated from a constant intensity input and are a function of the pixel columns 311–318. A streak defect in the actual printed toner density values 321, i.e., a different actual printed toner intensity value than the desired printed toner density values obtained at the pixel columns 311–315, and 317 and 318, is seen at the pixel column 316.

FIG. 3 shows the scan data toner density values 331 obtained by scanning the printed compensation pattern in the scan data when the pixel alignment between the printer pixel grid and the pixel grid in the compensation data is appropriately aligned. The streak defect, i.e., the different actual printed toner density is also seen at the pixel column 316 of the scan data toner density values 331. An appropriately compensated input gray level curve 341 is also shown in FIG. 3, which has a difference in the intensity value for the pixel column 316 that is opposite the difference in the actual printed toner density value for the pixel column 316 that occurs in the scan data toner density values 331 that compensates for the streak defect.

When the compensated input gray level curve 341 is sampled at the printer pixel column positions, the appropriately aligned compensated halftone density curve 351 also shows the different density in, or intensity values for, the pixel column 316. When the halftone density curve 351 is used in the printing process, the output density curve 361 has the desired constant density for all of the pixel columns 311–318.

FIG. 4 shows the scan data toner density values 332 obtained by scanning the printed compensation pattern when the pixel alignment between the printer pixel grid and the pixel grid in the compensation data is misaligned by one-half pixel. The streak defect in the actual printed toner density values, i.e., the difference in the actual printed toner density values, is now seen in scan data toner density values 332 as occurring between the pixel columns 315 and 316. As a result, a misaligned compensated input gray level curve 342, also shown in FIG. 4, is generated from the misaligned scan data toner density values 332. In particular, the misaligned compensated gray level curve 342, which has a difference in the intensity values for the pixel columns 315 and 316 that is opposite the difference in the scan data toner density values 332, but which is not aligned with the location of the different value, i.e., pixel column 316, of the actual printed toner density values 321.

When the input gray level curve 342 is sampled at the printer pixel column positions 311–318, using linear interpolation between the discrete pixel positions 311–318, the misaligned compensated halftone density curve 352 indicates that a density to be used that is in reality half the density needed to appropriately compensate for the streak defect, and that the compensation needs to be applied to both of the pixel columns 315 and 316. When the resulting halftone density curve 352 is used in the printing process, the output density curve 362 is over, or unnecessarily, compensated for the pixel column 315 and is under compensated for the pixel column 316. While the original streaking shown in the actual printed toner density values 321 has been modified, detectable streaking may still be seen in the output density values 362.

Figure 5:
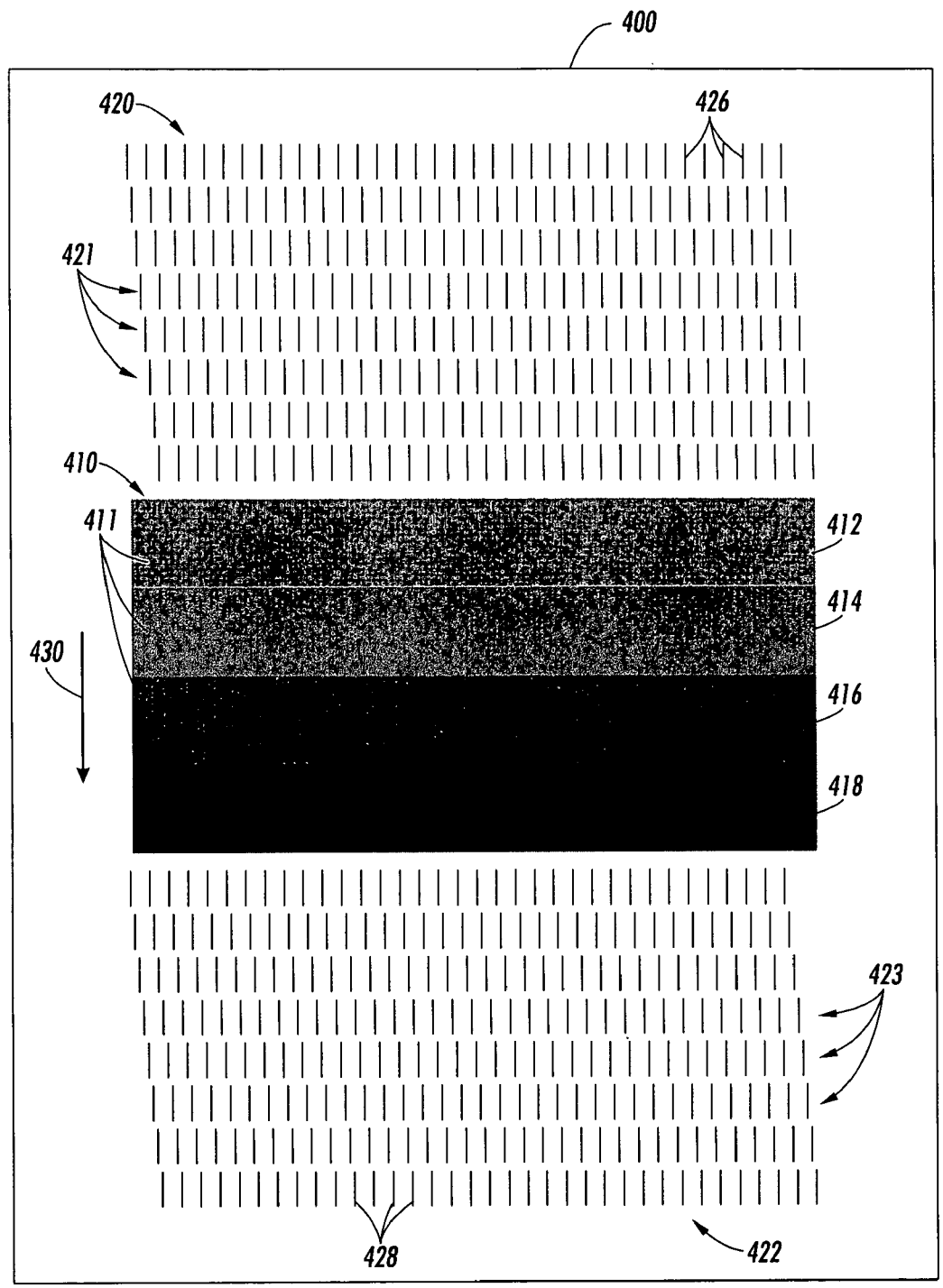
FIG. 5 illustrates a portion of a first exemplary embodiment of a compensation pattern usable to determine one or more parameters used in streak printing defect compensation according to this invention.

FIG. 5 shows a first exemplary embodiment of a compensation pattern 400 that allows the misalignment between the pixel grid and the scanning grid to be taken into account when determining the compensation parameters. The first compensation pattern shown in FIG. 5 includes a compensation region 410 having a number of gray level halftone strips 411, such as the four gray level halftone strips 412–418, and two sets 420 and 422 of alignment or fiducial marks 426 and 428, respectively. It should be appreciated that, in this exemplary embodiment, the marks 426 and 428 are usable as both alignment marks and as process control marks. Each of the gray level halftone strips 412–418 is a printed region generated using data having a single gray level. Each of the gray level halftone strips 412–418 has a gray level different from the other ones of the gray level halftone strips 412–418.

While four gray level halftone strips 412–418 are shown in FIG. 5, it should be appreciated that, in practice, a gray level halftone strip can be included for up to every distinct gray level the printer can print and multiple compensation pages can be used, if necessary. It should be appreciated that gray level halftone strips for less than all of the possible printer gray levels can be used. In this case, compensation data for the intermediate, unprinted, gray levels can be interpolated from the printed gray levels. It should also be appreciated that the halftone compensation region 410 can be a region that has a gradually increasing or decreasing toner density rather than multiple distinct gray level halftone strips 411, such as the strips 412–418, that have step changes in toner density.

The alignment or fiducial marks 421 and 423 are used to align the scan coordinates for the pixel columns to the coordinates of the pixel columns in the printed image. The two sets of alignment or fiducial marks 420 and 422 are placed before and after the halftone compensation region 410, respectively, along the process direction 430. Each set of alignment marks 420 and 422 organizes the alignment marks 426 and 428, respectively, into 8 rows 421 and 423 of a 1-on, 7-off line pattern. In various exemplary embodiments, the process control marks lines 426 and 428, respectively, of the rows 421 and 423 are a single pixel wide, although wider lines can be used in some situations. In each set 420 or 422, the alignment marks 426 and 428, respectively, in one row 421 or 423, respectively, are shifted over one pixel in the cross process direction relative to one other row 421 or 423 of the respective set 420 or 422. A 1-on, 7-off pattern is chosen to leave enough white space between the printed lines 426 and 428 to determine the obtained line width. The 8 rows 421 and 423 of the 1-on, 7-off pattern provide enough information to identify the line width and to obtain the toner density at the position of each pixel column in the printer coordinates.

It should be appreciated that a different on-off spacing can be chosen between the single-pixel-wide lines that still meet the requirements that there is no interaction between the different lines in a single row. When a different on-off pattern is chosen, the number of rows is changed so that all the pixel columns are printed with, for example, a single-pixel-wide line. It should also be appreciated that the lines within a single row need not be regularly spaced, but can be irregularly spaced, as shown in the exemplary embodiment shown in FIG. 7, as long as all the rows, when taken together, have at least one line printed in each pixel column.

Figure 6:
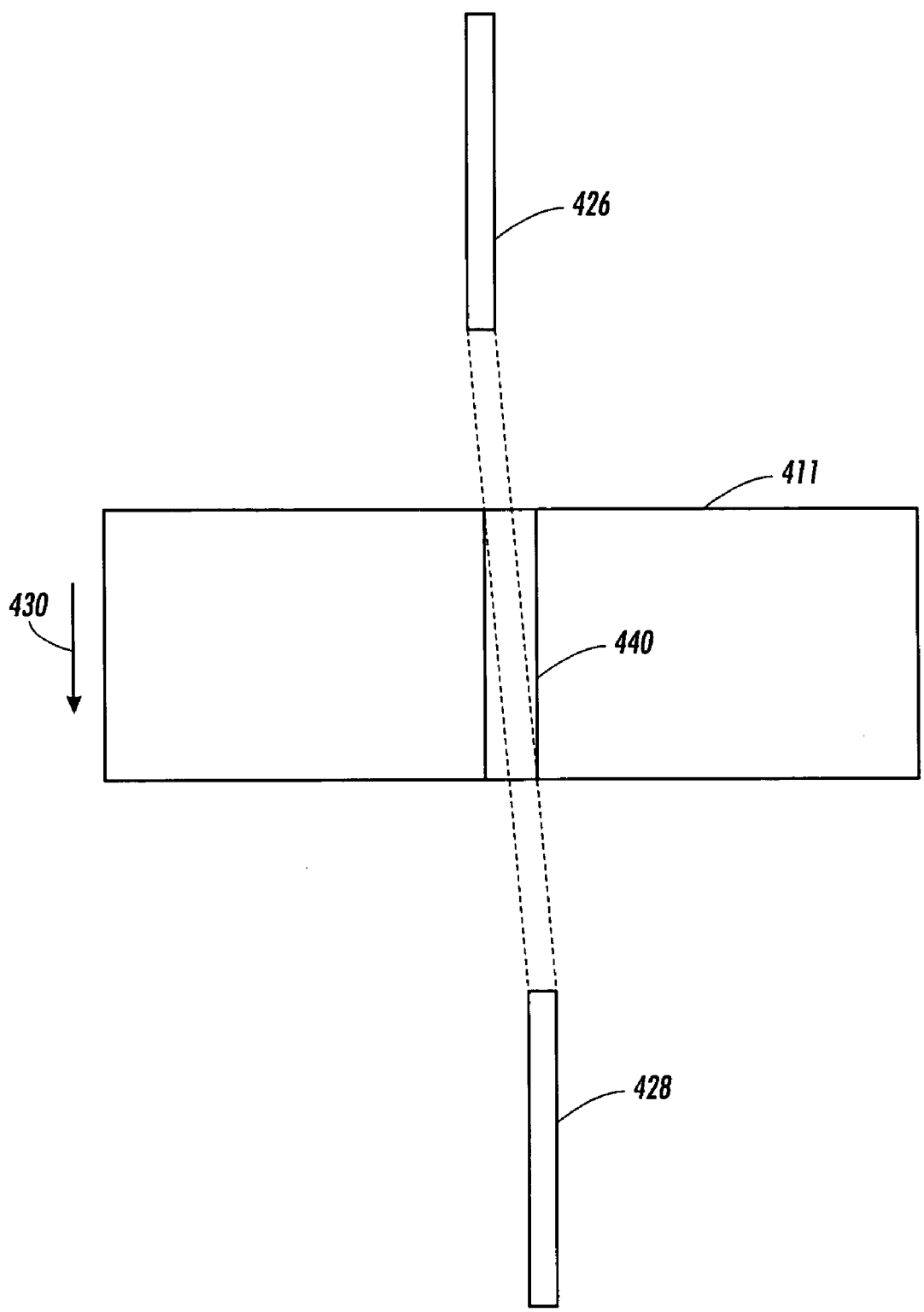
FIG. 6 illustrates one embodiment of how the compensation pattern shown in FIG. 5 can be used to identify pixels in the halftone compensation region to be used when determining a specific pixel column's compensation parameters.

FIG. 6 illustrates one embodiment of how the compensation pattern shown in FIG. 5 is used to identify a particular pixel column section 440 of a particular gray level halftone strip 411 of the halftone compensation region 410, when determining a specific pixel column's compensation parameters. First, the line width and centroid position of an appropriate one of the pixel column alignment or fiducial marks 426 of one of the rows 421 before the compensation region 410 and those of the pixel column alignment or fiducial mark 428 of one of the rows 423 after the halftone compensation region 410 are found.

The line width of the pixel column 440 in scan coordinates for a particular gray level halftone strip 411 is determined by averaging the scanner response over the length of the alignment or fiducial marks 426 and 428 for that pixel column 440, resulting in a cross-section of intensity vs. position. The left and right sides of the alignment or fiducial marks 426 and 428 are determined by finding where the cross-section of intensity vs. position for the pixel column 440 crosses a specific intensity threshold. If the crossing point occurs between two scan pixels, then the fraction of the distance between the two pixels is found using linear interpolation. The line width is the difference of the two crossing points.

The centroids of the alignment or fiducial marks 426 and 428 are also found by finding, for each alignment or fiducial mark, a scan pixel with a minimum reflectance about that alignment or fiducial mark 426 or 428. For each of the alignment or fiducial marks 426 and 428, a quadratic fit using the corresponding located scan pixel and two neighboring scan pixels adjacent to that scan pixel is performed. The minimums of each of these quadratic fits are determined to be the centroids of the alignment or fiducial mark 426 before the halftone compensation region 410 and of alignment or fiducial marks 428 after the halftone compensation region 410, respectively.

The centroid of the pixel column section 440 of a particular gray level halftone strip 411 of the halftone compensation region 410 is then determined by linear interpolation in the process direction between the centroids of the alignment or fiducial marks 426 and 428. The line width of the pixel column 440 and the centroid of the pixel column section 440 in the cross process direction and the boundaries of each halftone strip 411 of constant input density in the process direction are used to define the scanner pixel location of the pixel column section 440.

The actual printed toner density values of the scanner pixels along the process direction in the pixel column section 440 are then averaged together to provide the measured reflectance for the printer pixel column 440. The methods and systems of the 573 application are then used to generate a local tone reproduction curve from that pixel column 440 to the measured average scan toner density values for each printed halftone strip 412–418 for that pixel column 440. The local tone reproduction curve and the associated line width of that pixel column 440 are saved for use during printing. This process is repeated for each other pixel location 440 in the cross-process direction of the image forming device. It should be appreciated that a look-up table, which provides compensation factors based on the pixel column location and the input gray level value, can be used to implement the determined local tone reproduction curves.

It should be appreciated that there is a finctional dependence between the line thickness of the process control marks 426 or 428, which are, in various exemplary embodiments, nominally a single pixel wide, and the pixel column gray level. In general, the thicker the line width of the process control marks 426 or 428, the darker the pixel column gray level. Standard numerical fitting techniques are used to match the measured line widths to the local tone reproduction curves. When the measured width of the nominally single-pixel-wide process control mark 426 or 428 associated with a pixel column changes, a different tone reproduction curve, which is associated with the new line width, is selected.

Figure 7:
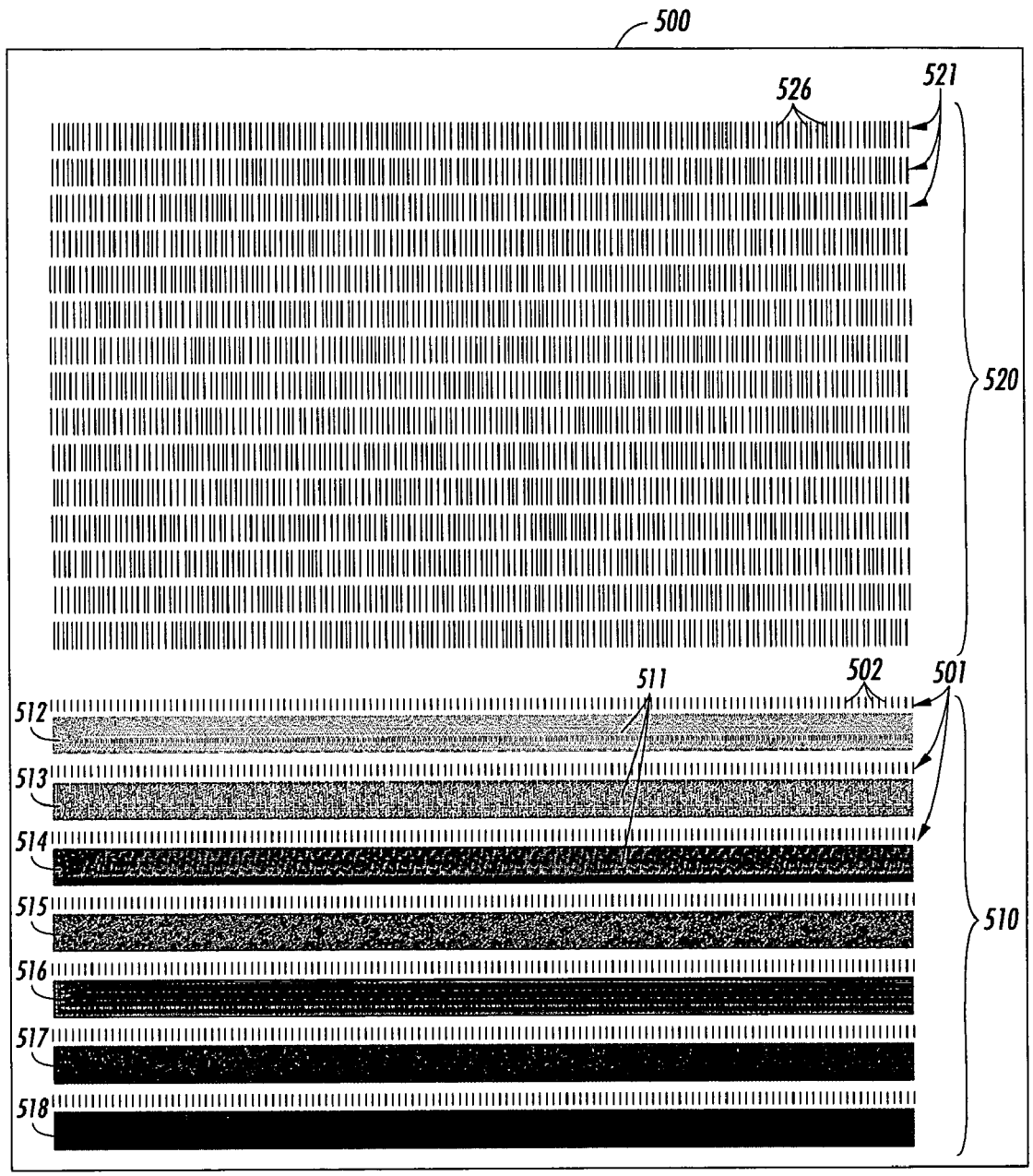
FIG. 7 illustrates a portion of a second exemplary embodiment of a compensation pattern usable to determine one or more parameters used in streak printing defect compensation according to this invention.

FIG. 7 shows a second exemplary embodiment of a compensation pattern that can be used to calibrate a single-pixel-wide process control mark to the halftone gray level according to this invention. Like the first compensation pattern shown in FIG. 5, the second compensation pattern 500 shown in FIG. 7 contains at least one region 520 of multiple lines 526 in multiple rows 521 that correspond to all the pixel columns in an image. In addition, multiple instances of the rows 521 are provided to minimize sensor noise. However, in each row 521, the regular line spacing of 1-on, 7-off is replaced with a random spacing. By using this second compensation pattern 500, drift from one line to another line is eliminated because the rows 521 are tied together by the repeats of random placement of the lines 526 across the second compensation pattern 500. A more detailed description of generating the random line pattern in the regions 520 is given in co-pending U.S. patent application 6,819,352 issued 16 Nov. 2004, which is incorporated herein by reference in its entirety.

In the first compensation pattern 400, the single-pixel-wide process control marks of the rows 421 and 423 are also used as the alignment marks to determine the spatial position at which the given gray strips should be analyzed to determine the corresponding gray level for a single-pixel-wide process control mark. On the other hand, in the second compensation pattern 500 shown in FIG. 7, a separate part of the image contains a set 510 of N gray level strips 511, such as the strips 512–518 shown in FIG. 7. At least one set of fiducial marks 550, which can be used to transform the spatial position of a given gray level strip 511 from scanner units to digital image units is adjacent to each gray strip 511. The details of the image processing required to transform this image into a table of gray level vs. pixel column is set forth in co-pending U.S. patent application Ser. No. 10/701, 475, which is incorporated herein by reference in its entirety.

Figure 8:
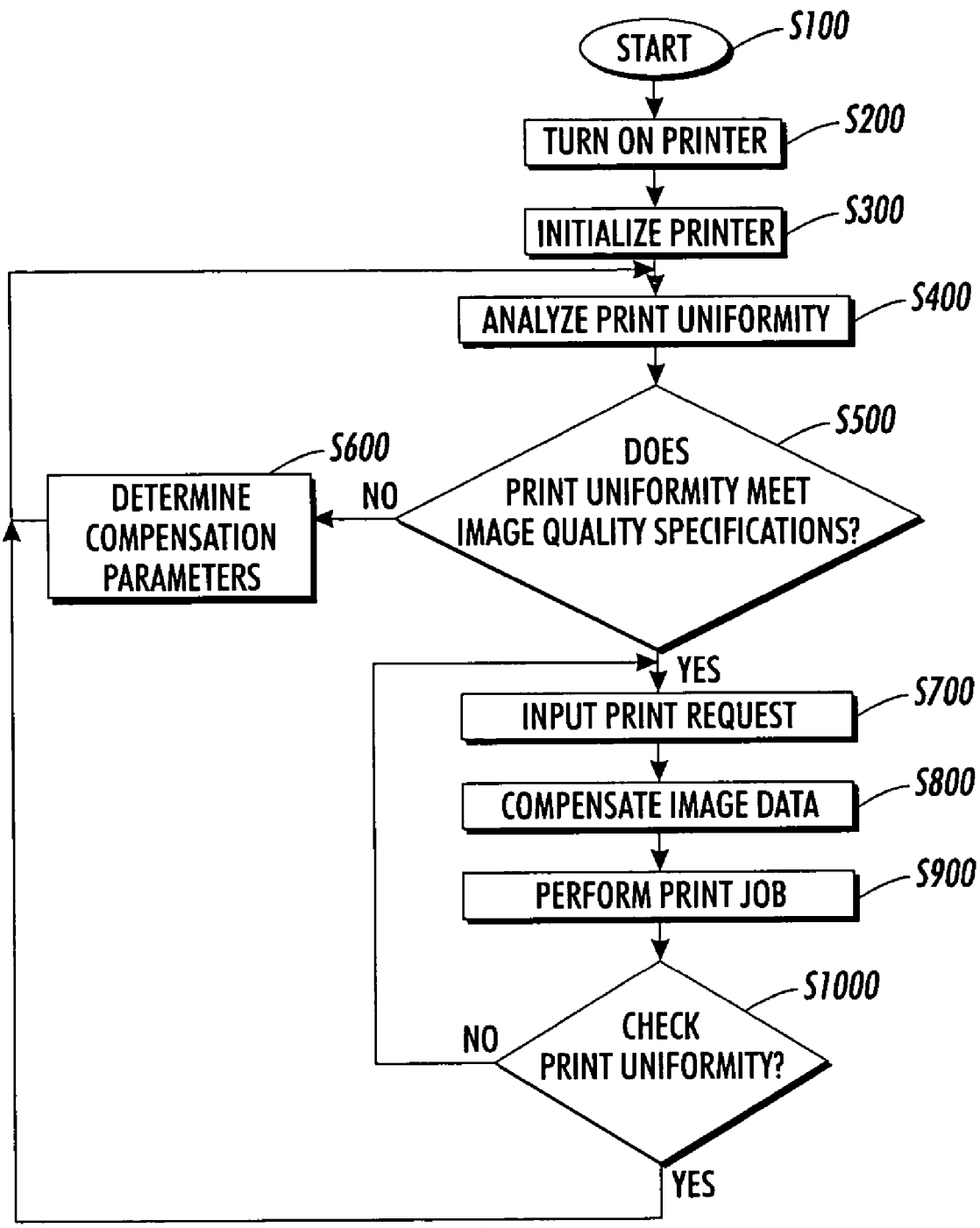
FIG. 8 is a flowchart outlining one exemplary embodiment of a system and method for determining and applying compensation parameters usable to compensate for streak print defects.

FIG. 8 is a flowchart outlining one exemplary embodiment of a method for compensating for streak print defects in an image forming device according to this invention. As shown in FIG. 8, operation of the method begins in step S100, and continues to step S200, where the image forming device is turned on. Then, in step S300, the image forming device is initialized. Next, in step S400, the print uniformity is analyzed. Operation then continues to step S500.

In step S500, a determination is made whether the analyzed print uniformity meets a desired image quality specification. If not, operation continues to step S600. Otherwise, operation jumps to step S700. In step S600, compensation parameters that are intended to reduce, and ideally eliminate, the print non-uniformities are determined. Operation then returns to step S400. In contrast, in step S700, a print request is input. Then, in step S800, the compensation parameters are used to modify the image data of the output image by changing the gray level as a function of the particular pixel column that a given pixel falls into. Next, in step S900, the image data is used by the image forming device to generate an output image on a receiving substrate. Then, in step S1000, a determination is made whether the print uniformity is to be checked. If so, operation returns to step S400. Otherwise, operation returns to step S700.

Figure 9:
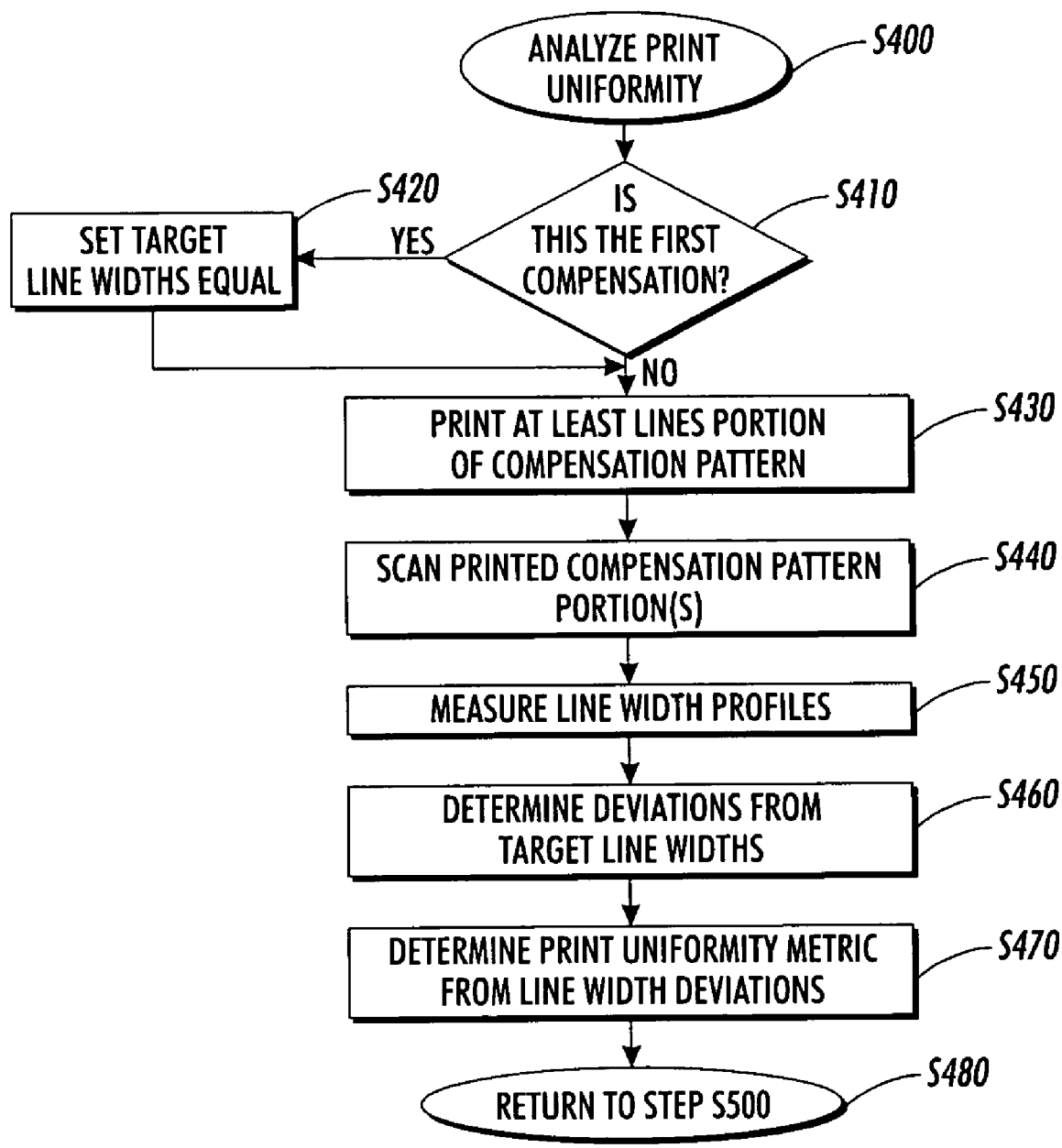
FIG. 9 is a flowchart outlining in greater detail one exemplary embodiment of a method for analyzing the uniformity of the compensation test pattern.

FIG. 9 is a flowchart outlining in greater detail one exemplary embodiment of a method for analyzing the print uniformity. As shown in FIG. 9, operation of the method begins in step S400, and continues to step S410, where a determination is made whether this is the first time the compensation pattern is being used to compensate for streak defects. If so, operation continues to step S420. Otherwise, operation jumps directly to step S430. In step S420, target widths of the single-pixel-wide process control marks are set equal for all pixel columns in the compensation image. Operation then continues to step S430, where at least a process control mark portion of the compensation pattern is printed. For example, at least the process control mark regions 420 or 520 shown in FIGS. 5 and 7, respectively, are printed. Then, in step S440, the printed portion of the compensation pattern is scanned to generate an image, i.e., image data, of the printed portion of the compensation pattern. It should be appreciated that the printed compensation test pattern can be scanned internally within the image forming device or can be scanned using a physically separate scanner. Next, in step 450, the line widths of the scanned process control marks are measured. Operation then continues to step S460.

In step S460, for each process control mark, difference between the measured line width and the target line width, is determined. Next, in step S470, a uniformity metric is determined from the line width deviations determined in step S460, as a function of the pixel column each measured process control mark is associated with. Operation then continues to step S480, where operation returns to step S500.

Figure 10:
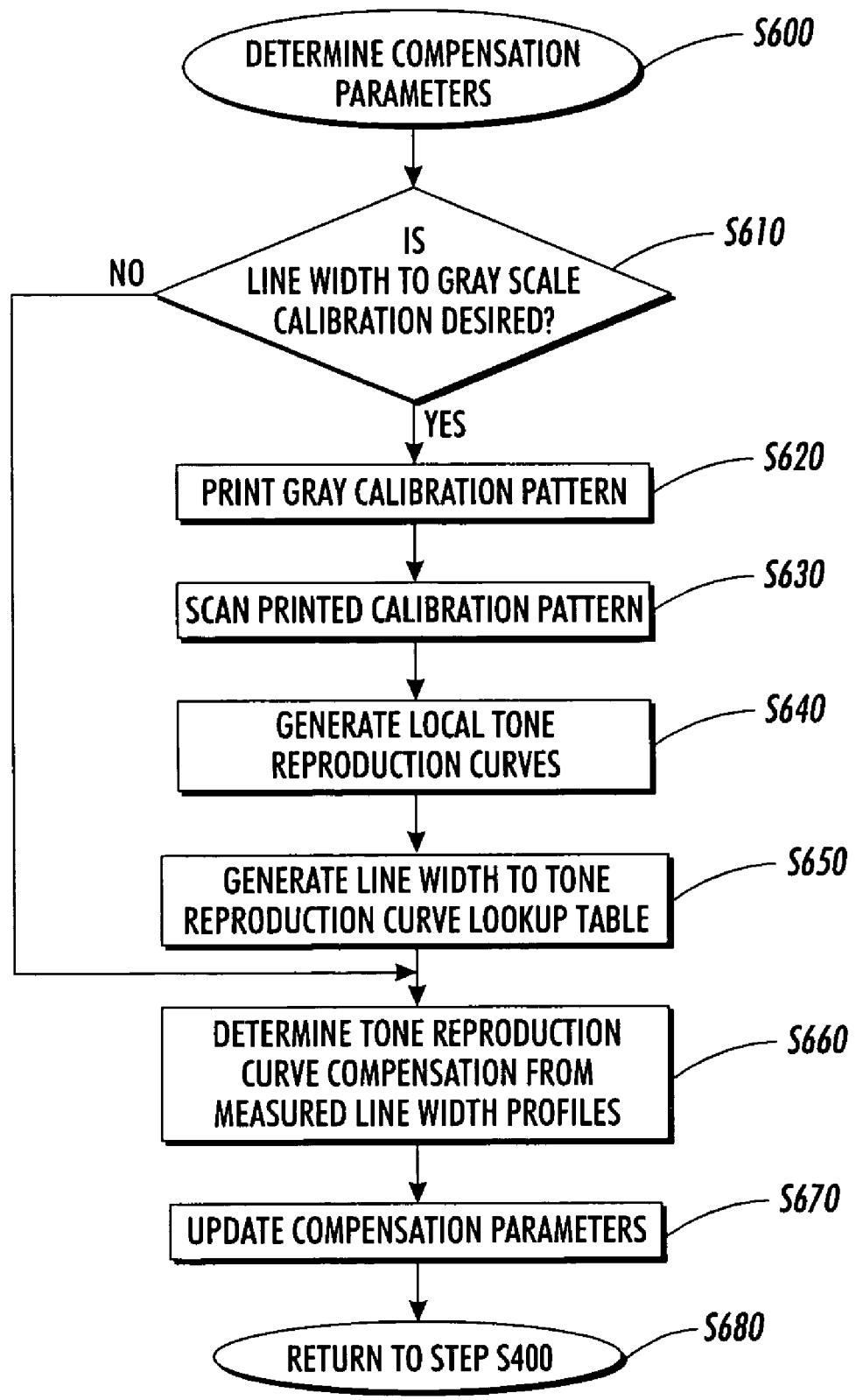
FIG. 10 is a flowchart outlining in greater detail one exemplary embodiment of a method for calibrating the pattern that is monitored to the pattern that is used to determining the values of the compensation parameters.

FIG. 10 is a flowchart outlining in greater detail one exemplary embodiment of a method for determining the compensation parameters usable to mitigate streaking in an image. As shown in FIG. 10, operation of the method begins in step S620 and continues to step S610, where a determination is made whether calibrating the actual line width to the gray scale values is desired. If not, operation jumps directly to step S630. However, if this calibration is desired, operation continues to step S620, where at least a gray calibration portion of the calibration pattern, such as the pattern 400 and the alignment portion 510 shown in FIGS. 5 and 7, respectively, is printed. Then, in step S630, at least the printed gray calibration portion of the compensation pattern is scanned or otherwise processed to obtain an electronic version or image of at least the printed gray calibration portion. It should be appreciated that at least the printed gray calibration portion can be scanned internally within the image forming device or can be scanned using a physically separate scanner. Next, in step S640, the image of at least the printed gray calibration portion is analyzed to generate a local tone reproduction curve for each pixel location along the cross-process direction. Operation then continues to step S650.

In step S650, the measured line widths of the process control marks obtained in step S450 and the local tone reproduction curves obtained in step S640 are used to create a calibration curve that relates each line width value to a particular tone reproduction curve. Next, in step S660, the individual line width measurements and corresponding gray level measurements are related so that a tone reproduction curve can be determined for each different line width. Then, in step S670, the local tone reproduction curve compensation parameters for each pixel location of the image forming device are updated based on the local tone reproduction curve measurements. Operation then continues to step S680, where operation returns to step S400.

It should be appreciated that, in step S610, it would be desirable to calibrate the line width to the gray scale values if no calibration has yet been performed. Calibration would also be desirable if the state of the image forming device has changed in such a way that the dependence of the widths of the single-pixel-wide process control marks on the gray level may have changed. An example of such an occurrence that could change this relationship is when a customer replaceable unit of the image forming device has been replaced.

Figure 11:
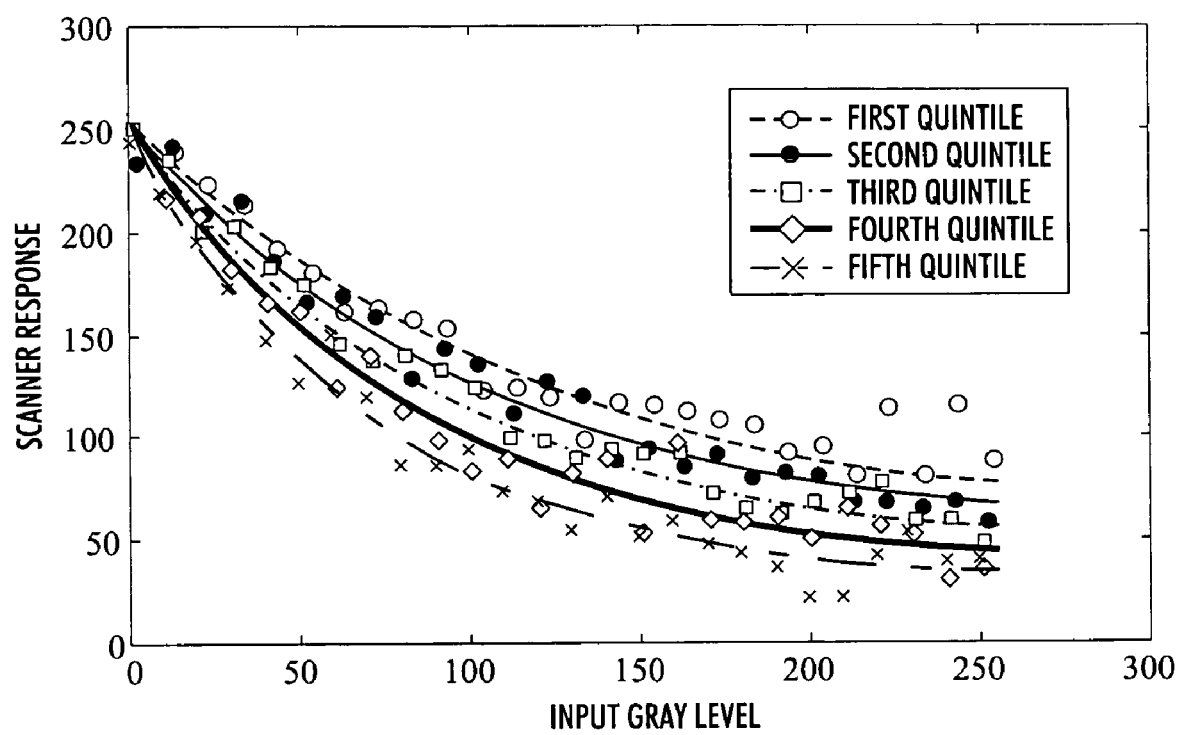
FIG. 11 is a graph illustrating relationships between line widths and tone reproduction curves.

FIG. 11 illustrates a series of tone reproduction curves and the relationship of the curves to the line widths that correspond to each curve. In FIG. 11, the x-axis represents the input gray level of each of the strips in the test pattern such as, for example, the test patterns shown in FIGS. 5 and 7. The y-axis represents the scanner response obtained upon scanning the test pattern. Each of the 5 different symbols corresponds to a different subset of widths of the process control lines. Each symbol indicates the measured scanner response at a particular pixel column across the strip. The corresponding tone reproduction curves are related to the line width measured for the process control mark associated with a particular pixel column. In FIG. 11, the line widths are grouped into 5 subsets or quintiles, and each individual points is grouped along the tone reproduction curve according to which subset that particular point lies.

In FIG. 11, the 'x' points correspond to the thickest lines, i.e., the fifth quintile of line widths, in the image, where the tone reproduction curve is on the average darker locally compared to other parts of the image. In contrast, the "o" points correspond to the thinnest lines, i.e., the first quintile of line widths, in the image, where the tone reproduction curve is on the average lighter locally compared to other parts of the image. Each intermediate line represents an intermediate quintile of the line widths.

FIG. 11 also illustrates how to parameterize the measurement values for each individual point so that the tone reproduction curve can be determined from the determined line widths. That is, in FIG. 11, the solid lines are the tone reproduction curves that have been fit to a corresponding subset of the data points based on a parameterized function. It should be appreciated that the particular function depends on the response of the image forming device, and can be tailored to work for each particular image forming device. The individual data points will be scattered due to measurement noise and noise within the image forming device. However, with this technique it is likely that the individual data points all will be monitored, and thus the functional fit will average over this noise.

Alternatively, in various other exemplary embodiments of step S670, the tone reproduction curve for each line width can be determined by regressing a single function to the scanner response vs. the input gray level and the line width. Knowing this function allows the toner reproduction curve to be determined merely by measuring the line width. The technique is described in the incorporated patent application Ser. No. 10/701,475.

Figure 13:
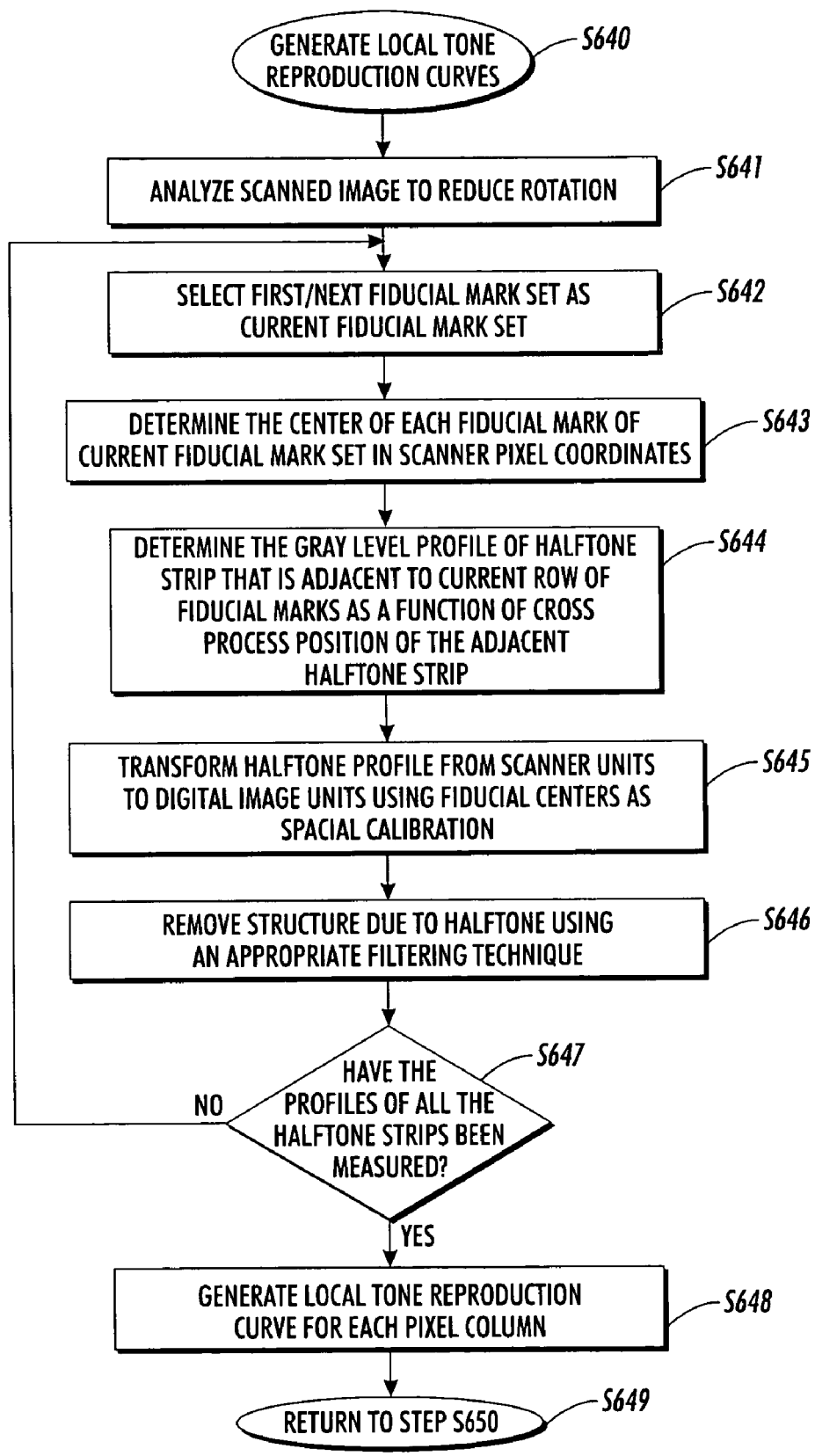
FIG. 13 is a flowchart outlining in greater detail one exemplary embodiment of the method for accurately measuring the gray level profile of a series of strips and converting the profile from scanner units to image pixel units.

FIG. 13 is a flowchart outlining in greater detail one exemplary embodiment of a method for generating a set of local tone reproduction curves according to this invention using, for example, the alignment portion 510 of the test pattern shown in FIG. 7. As shown in FIG. 13, operation of the method begins in step S650 and continues to step S641, where the scanned image is analyzed and modified to reduce, and ideally eliminate, any rotation of the scanned image data relative to the process and cross-process directions of the image forming device. Then, in step S642, the first or next row of alignment or fiducial marks, such as the rows of marks 501 shown in FIG. 7, is selected as a current row. Next, in step S643, for each fiducial or alignment mark in the current row, a centroid of that fiducial or alignment mark is determined. Operation then continues to step S644.

In step S644, a profile of the halftone strip that is adjacent the current row of fiducial marks, i.e., a current halftone strip or gray level strip, is generated as a function of position in scanner pixel units along the cross-process direction. Next, in step S645, the profile of the current halftone strip or gray level strip is transformed from being defined based on the scanner pixel units to being defined based on digital image pixel units. In various exemplary embodiments, the profile is transformed based on the relationship between the measured centroid positions and the digital image centroid position of the fiducial marks of the current row of fiducial marks. Operation then continues to step S646.

In step S646, the high frequency structure in the profile of the current halftone strip, or gray level strip, due to the halftone screen is removed. Next, in step S647, a determination is made whether all of the halftone or gray level strips have been analyzed. If all of the halftone or gray level strips have been analyzed, operation continues to step S648. Otherwise, if not all the halftone or gray level strips have been analyzed, operation returns to step S642.

In step S648, a local tone reproduction curve is generated for each pixel column, in the digital image units, based on the transformed halftone profiles. Operation then continues to step S649, where operation returns to step S650.

It should be appreciated that the captured image obtained by scanning the printed compensation test pattern may not be perfectly oriented to the scanning axes due to rotation of the paper on the scanner platen and/or rotation of the printed image on the paper. Therefore, in step S641 rotation of the image relative to the scanning axes is determined using, for example, features of the printed compensation test pattern and/or features of the fiducial marks printed elsewhere on the printed compensation test pattern for this purpose. The determined rotation, if any, of the image is reduced by applying any appropriate image processing technique. Alternatively, the image can be processed based on the measured rotation to identify features within the image.

As shown in FIG. 7, the printed compensation test pattern includes some number of rows or sets 501 of fiducial marks 502 and what should be uniform halftone strips 511. In step S642, selecting a row can be performed using any of a number of conventional techniques. One particular robust technique is to scan, line by line, through the captured image to identify those scan lines that give a strong signal at the period of the spacing between the fiducial marks 502. From the location of that fiducial row 501, the position of any adjacent halftone strips 511 can also be identified. Alternatively, the positions of the adjacent halftone strips 511 can be identified using edge location marks.

In various exemplary embodiments, in step S643, the centroid of a fiducial or alignment mark is determined by taking a cross-section through all of the fiducial marks of the current row of fiducial marks, averaging over the length of those fiducial marks.

It should be appreciated that, in step S646, the halftone frequency structure can be removed using any appropriate known or later-developed technique. One technique is to use distributed aperture filtering. In this technique, over short segments of the image, the change in gray level as a function of pixel at the halftone period is determined and subtracted from the profile. It should be appreciated that, in various exemplary embodiments, in step S648, a set of Np×Ns gray levels have been obtained. In such exemplary embodiments, Np is the number of pixel columns in the printed compensation test pattern and Ns is the number of strips in the printed compensation test pattern. These gray level values can be ordered by column to obtain a set of Np local tone reproduction curves, where the local tone reproduction curve has been sampled at Ns points. It should be appreciated that the methods and systems of the 573 patent, or of any other appropriate local tone reproduction curve generating technique, can be used to generate the local tone reproduction curve for each cross-process-direction image forming device pixel location based on the average gray levels of the halftone strips for cross-process-direction scanner image pixel column and the determined relationship between the cross-process-direction image-forming device pixel locations and the cross-process-direction scanner image pixel columns.

As outlined above with respect to FIG. 7, some pairs of adjacent compensation strips may not have intervening intermediate sets of fiducial marks. Likewise, the first or last sets of fiducial marks may be omitted. In some such exemplary embodiments, one or more sets of fiducial marks may each be associated with two or more compensation strips. In such exemplary embodiments, after a first or next set of fiducial marks is selected in step S642, before steps S643 and 644 are performed, if the selected set of fiducial marks has two or more compensation strips associated with that selected set of fiducial marks, one of those associated compensation strips is selected as the current compensation strip. In such exemplary embodiments, steps S643 and S646 are then performed for that current compensation strip. Then, before step S647 is performed, each other compensation strip associated with the selected set of fiducial marks is selected in turn and steps S643–S646 are repeated for that compensation strip.

Figure 12:
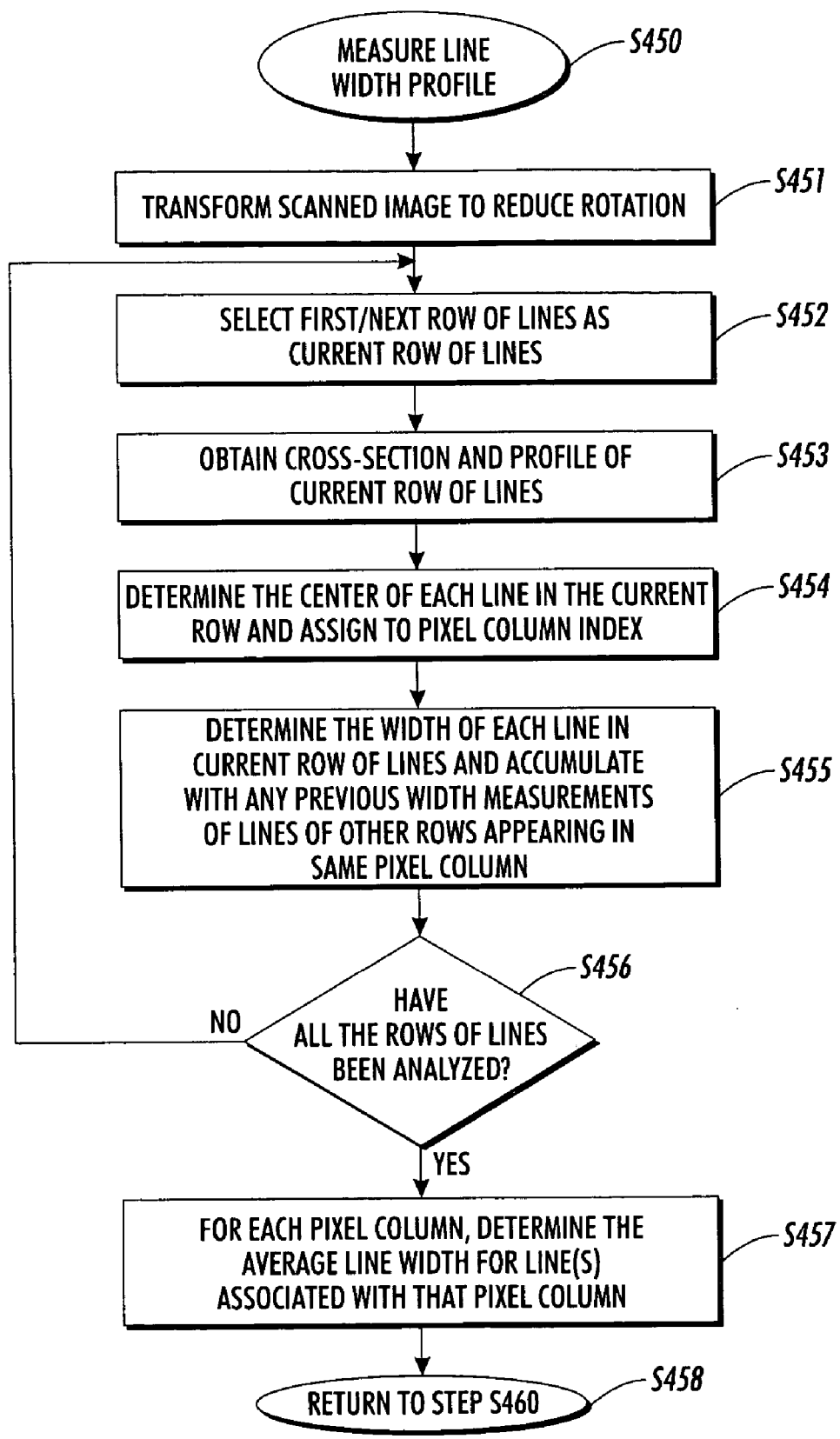
FIG. 12 is a flowchart outlining in greater detail one exemplary embodiment of the method for measuring the line width profile according to this invention.

FIG. 12 is a flowchart outlining in greater detail one exemplary embodiment of the method for measuring the profile of line widths as a function of position in the cross process direction. As shown in FIG. 12, operation of the method begins in step S450, and continues to step S451, where the second image is transformed to reduce, and ideally eliminate, any rotation of the image with respect to the scanner axes. Then, in step S452, a first or next row of process control marks, such as, for example, the rows 521 of the process control marks 526, is selected as the current row of lines. Next, in step S453, a cross section in the process direction is taken through the current row, and the profile is obtained. Operation then continues to step S454.

In step S454, a center of each process control mark is determined and is assigned an index position in the cross process direction based on knowledge of the compensation pattern. Next, in step S455, for each cross process control mark index position, the line width is measured. The compensation pattern may contain a number of process control marks, on different rows, at the same process control mark index position. If so, these repeat measurements can also be measured in this instance of step S455 or the width determination of such process control marks can be delayed to a subsequent instance of step S455. Then, in step S456, a determination is made whether all of the rows of lines have been analyzed. If not, operation returns to step S452. Otherwise, if all of the rows of lines have been selected and analyzed, operation continues to step S457, where an average is calculated for each repeated measurement, if any. Operation then continues to step S458, where operation returns to step S460.

Figure 14:
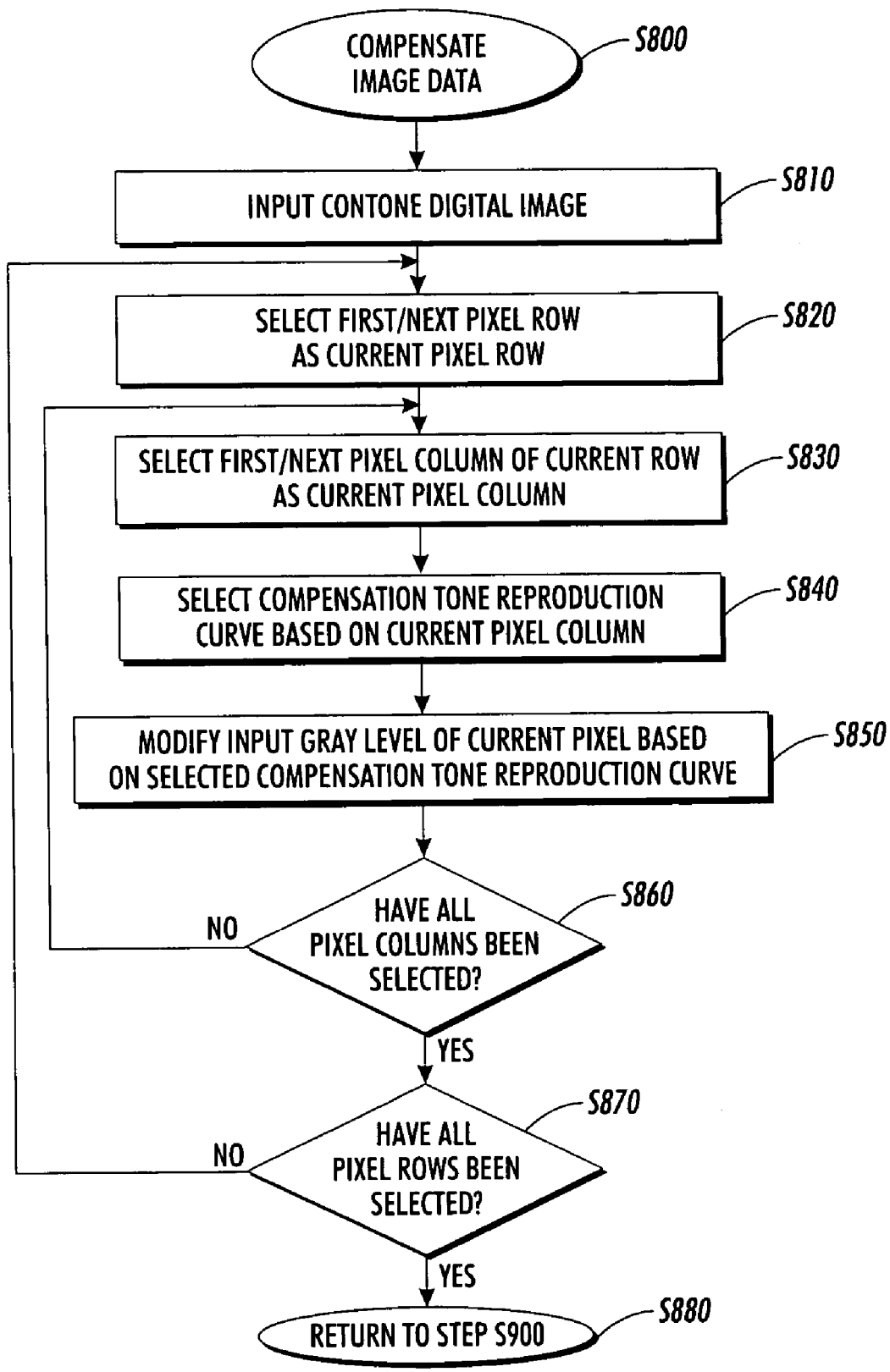
FIG. 14 is a flowchart outlining in greater detail one exemplary embodiment of the method for compensating the image data according to this invention.

FIG. 14 is a flowchart outlining in greater detail one exemplary embodiment of the method for printing an image using the compensation parameters to compensate for streak defects. As shown in FIG. 14, operation of the method begins in step S800, and continues to step S810, where the image data is input. Then, in step S820, the first or next row of pixels in the image data is selected as the current pixel row. Next, in step S830, the first or next pixel column of the current pixel row is selected as the current pixel column. Operation then continues to step S840.

In step S840, a compensation tone reproduction curve is selected based on the input gray level of the current pixel and the current pixel column. Then, in step S850, the input gray is modified using the compensation tone reproduction curve. Next, in step S860, a determination is made whether all of the pixel columns have been selected. If so, operation continues to step S870. Otherwise, operation returns to step S830.

In step S870, a determination is made whether all of the pixel rows of the image have been selected. If not, operation returns to step S820. Otherwise, operation continues to step S880, where operation of the method returns to step S900.

Figure 15:
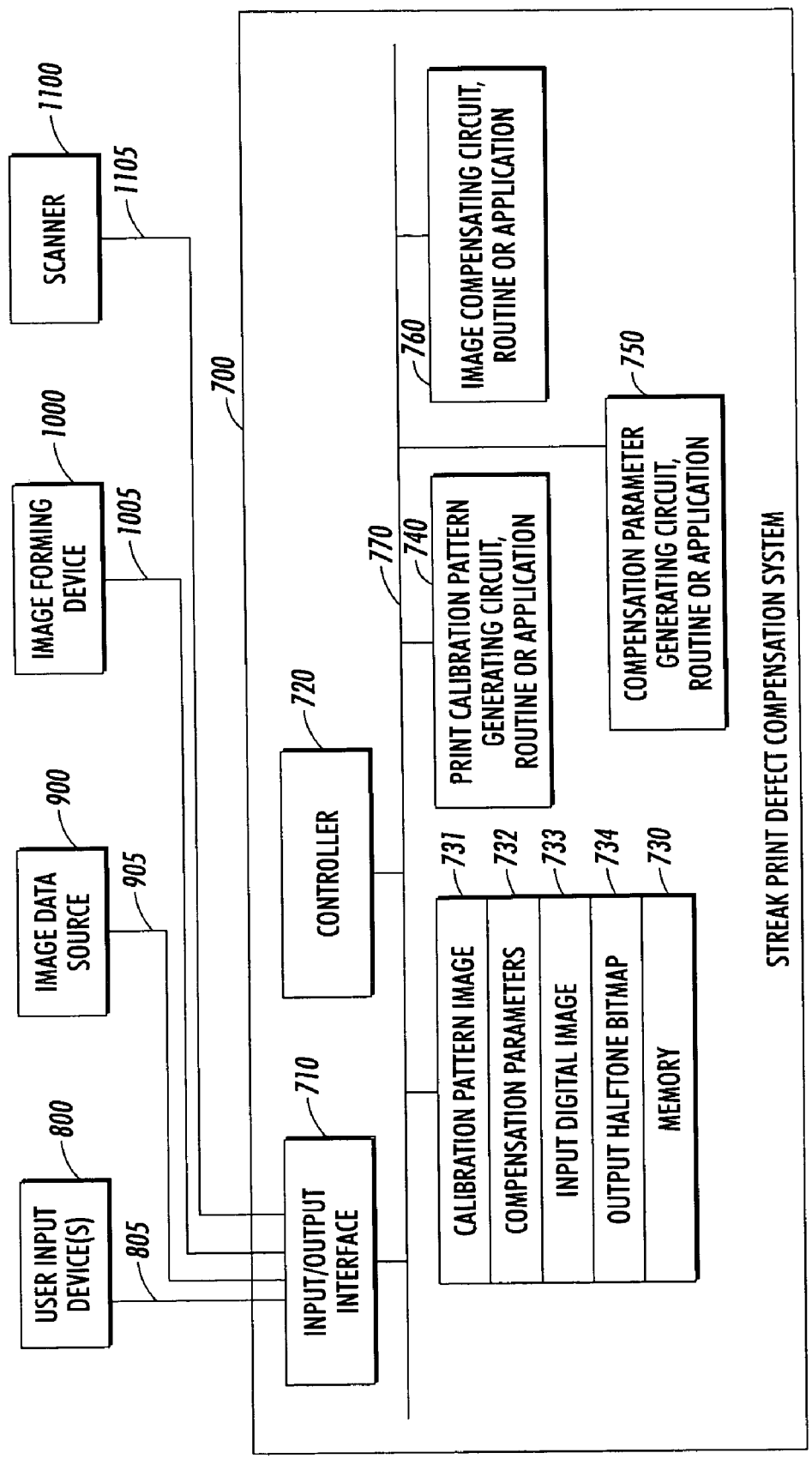
FIG. 15 is a block diagram of one exemplary embodiment of a streak defect compensation system according to this invention.

FIG. 15 shows one exemplary embodiment of a streak defect compensation system 700 according to this invention. As shown in FIG. 15, the streak defect compensation system 700 includes an input/output interface 710, a controller 720, a memory 730, a compensation pattern generating circuit, routine or application 740, a compensation parameter generating circuit, routine or application 750, and an image data compensating circuit, routine or application 760, interconnected by one or more control and/or data busses and/or application programming interfaces 770.

As shown in FIG. 15, one or more user input device(s) 800, a image data source 900, an image forming device 1000, and a scanner 1100 are connected to the streak defect compensation system 700 by links 805, 905, 1005 and 1105, respectively.

In general, the image data source 900 shown in FIG. 15 can be any known or later-developed device that is capable of providing image data to the streak defect compensation system 700. In general, the image forming device 1000 shown in FIG. 15, can be any known or later-developed device that is capable of printing image data and is susceptible to streak defects that can be compensated for using the streak defect compensation system 700. In general, the scanner shown in FIG. 15 can be any known or later-developed device that is capable of imaging hardcopy material to produce image data from that hardcopy material that can then be input into the streak defect compensation system 700.

The image data source 900, the image forming device 1000, and/or the scanner 1100 can be integrated with the streak print defect correction system 700, such as in a general-purpose digital copier. In addition, the streak defect compensation system 700 may be integrated with devices providing additional functions in addition to the image data source 900, the image forming device 1000, and/or the scanner 1100, in a larger system that performs all functions, such as a multi-function printer/scanner/copier/fax device.

Each of the respective one or more user input device(s) 800 may be one or any combination of multiple input devices, such as a keyboard, a mouse, a joy stick, a trackball, a touch pad, a touch screen, a pen-based system, a microphone and associated voice recognition software, or any other known or later-developed device for inputting data and/or user commands to the streak print defect correction system 700. It should be understood that the one or more user input device(s) 800 of FIG. 15 do not need to be the same type of device.

Each of the links 805, 905, 1005 and 1105 connecting the user input device(s) 800, the image data source 900, and the image forming device 1000 to the streak print defect correction system 700 can be a direct cable connection, a modem, a local area network, a wide area network, and intranet, the Internet, any other distributed processing network, or any other known or later developed connection device. It should be appreciated that each of these links 805, 905, 1005 and 1105 may include wired or wireless portions. In general, each of the links 805, 905, 1005 and 1105 can be implemented using any known or later-developed connection system or structure usable to connect the respective devices to the streak print defect correction system 700. It should be understood that the links 805, 905, 1005 and 1105 do not need to be of the same type.

As shown in FIG. 15, the memory 730 can be implemented using any appropriate combination of alterable, volatile, or non-volatile memory or non-alterable, or fixed memory. The alterable memory, whether volatile or non-volatile, can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, and gaps an optical ROM disk, such as a CD-ROM or DVD-ROM disk and disk drive or the like.

Each of the various embodiments of the streak defect compensation system 700 can be implemented as software executing on a programmed general purpose computer, a special purpose computer, a microprocessor or the like. It should also be understood that each of the circuits, routines, applications, objects, managers or procedures shown in FIG. 15 can be implemented as portions of a suitably programmed general-purpose computer. Alternatively, each of the circuits, routines, applications, objects, managers or procedures shown in FIG. 15 can be implemented as physically distinct hardware circuits within an ASIC, using a digital signal processor (DSP), using a FPGA, a PLD, a PLA and/or a PAL, or using discrete logic elements or discrete circuit elements. The particular form of the circuits, routines, applications, objects, managers or procedures shown in FIG. 15 will take is a design choice and will be obvious and predictable to those skilled in the art. It should be appreciated that the circuits, routines, applications, objects, managers or procedures shown in FIG. 15 do not need to be of the same design.

When operating the streak defect compensation system 700, a print input image request can be input from one of the user input device(s) 800 over the link 805 or from the image forming device 1000 over the link 1005. The input/output interface 710 inputs the print input image request, and under the control of the controller 720, forwards it to the image data compensation circuit, routine or application 760.

When operating the streak defect compensation system 700, a compensation request can be input from one of the user input device(s) 800 over the link 805 or from the image forming device 1000 over the link 1005 shown in FIG. 15. The input/output interface 710 inputs the compensation or update compensation parameters request, and under the control of the controller 720, forwards it to the compensation pattern generating circuit, routine or application 740.

The compensation pattern generating circuit, routine or application 740 then retrieves, under control of the controller 720, the compensation pattern image from the compensation pattern image portion 731 of the memory 730. The compensation pattern generating circuit, routine or application 740 then outputs the compensation pattern image, under the control of the controller 720, to the image forming device 1000 through the input/output interface 710 and over the link 1005. In various exemplary embodiments that iteratively modify the printed compensation test pattern, the compensation pattern generating circuit, routine or application 740 may apply compensation parameters $\Delta G_{jk}$ determined in a previous iteration to the compensation test pattern before outputting the compensation test pattern to the image forming device 1000 and printed onto a receiving medium, such as a hard copy.

The scanned image of the printed compensation pattern is then input from the scanner 1100 over the link 1105. The input/output interface 710 inputs the scanned image of the printed compensation pattern, and, under the control of the controller 720, forwards the scanned image data to the compensation parameter generating circuit, routine or application 750 and/or to the calibration pattern image portion 731.

The compensation parameter generating circuit, routine or application 750, under control of the controller 720, input the scanned image data from the calibration pattern image portion 731 or directly from the scanner 1100. The compensation parameter generating circuit, routine or application 750 determines the compensation parameters to be used in the streak correction process, in the form of local tone reproduction curves, and/or in the form of gray level offset look-up tables, as described above. The compensation parameter generating circuit, routine or application 750 then, under the control of the controller 720, stores the compensation parameters in the compensation parameters portion 732 of the memory 730. It should be appreciated that, in various exemplary embodiments that iteratively determine the compensation parameters $\Delta G_{jk}$, the compensation parameter generating circuit, routine or application 750 also determines if sufficient uniformity in the halftone strips has been obtained. If not, the compensation parameter generating circuit, routine or application 750 causes, under control of the controller 720, the compensation pattern generating circuit, routine or application 740 to generate and print another compensation test pattern.

The image data compensating circuit, routine or application 760 then, under control of the controller 720, either retrieves the compensation parameters from the compensation parameters portion 732 of the memory 730 or receives compensation parameters directly from the compensation parameter generating circuit, routine or application 750. The image data compensating circuit, routine or application 760, under control of the controller 720, also either retrieves the input image data from the input image data portion 733 of the memory 730, and/or receives the input image data directly from the image data source 900 over the link 905.

The image data compensating circuit, routine or application 760 modifies the image data to compensate for the streak defects, as described above. The image data compensating circuit, routine or application 760, under the control of the controller 720, stores the compensated image data in the compensated image portion 734 of the memory 730 or outputs it directly to the image forming device 1000 via the input/output interface 710 and over the link 1005.

While this invention has been described in conjunction with the exemplary embodiments outlined above, various alternatives, modifications, variations, Improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later-developed alternatives, modifications, variations, improvements, and/or substantial equivalents.

What is claimed is:

1. A method for compensating for streak defects in an image formed using an image forming device that forms the image on a receiving material that is translated through the image forming device along a process direction, comprising:
    printing a compensation pattern usable to determine a difference in gray level between an actual gray level value and an intended gray level value at a number of cross-process-direction image-forming device pixel locations in the image, comprising:
        printing a plurality of gray level portions, each gray level portion extending along the cross-process direction and having an intended gray level that is different from that of the other gray level portions, the plurality of gray level portions arranged along the process direction,
        printing a plurality of rows of first marks, each row of first marks extending along the cross-process direction, wherein, for each cross-process-direction pixel location of the compensation pattern along the cross-process direction, there is a first mark in at least one of the rows of first marks that is aligned with that cross-process-direction pixel location, printing a first plurality of rows of fiducial marks, at least one pair of fiducial marks in each row being separated by a whitespace, each row of fiducial marks comprising a number of the fiducial marks that are spaced at a given interval along the cross-process direction, and printing a second plurality of rows of fiducial marks, at least one pair of fiducial marks in each row being separated by a whitespace, each row of fiducial marks comprising a number of the fiducial marks that are spaced at a given interval along the cross-process direction, the plurality of gray level portions being between the first and second plurality of rows of fiducial marks;

scanning the printed compensation pattern to generate a set of scanned image data, the scanned image data defining an image value for each of a plurality of scanned image cross-process-direction pixel locations for at least one of the gray level portions and at least one of at least one row of first marks and at least one row of fiducial marks;

analyzing the scanned image data to determine at least one of a width for at least one first mark and at least one actual gray level value for at least one of the plurality of gray level portions for at least one cross-process-direction image-forming device pixel location based on a position in the scanned image pixel location of at least one fiducial in the scanned image data; and generating, for each analyzed cross-process-direction image-forming device pixel location, for each analyzed gray level portion of that analyzed cross-process-direction image-forming device pixel location, at least one compensation parameter based on the determined actual gray level value and the intended gray level value for that analyzed gray level portion for that analyzed cross-process-direction image-forming device pixel location.

2. The method of claim 1, wherein:

printing the plurality of gray level portions comprises printing the plurality of gray level portions so that the plurality of gray level portions are spaced from each other along the process direction such that a gap is provided between each pair of adjacent gray level portions; and printing the plurality of rows of fiducial marks comprises printing the plurality of rows of fiducial marks such that at least one row of fiducial marks is adjacent to each gray level portion.

3. The method of claim 2, wherein analyzing the scanned image data to determine at least one actual gray level value for at least one of the plurality of gray level portions for at least one cross-process-direction image-forming device pixel location based on a position in the scanned image pixel location of at least one fiducial mark comprises determining at least one actual gray level value for at least one of the plurality of gray level portions for at least one cross-process-direction image-forming device pixel location based on positions in the scanned image pixel location of fiducial marks in at least two rows of fiducial marks.

4. The method of claim 1, wherein determining the width of at least one first mark comprises:

determining, for a given cross-process-direction image-forming device pixel location, for each first mark that is aligned with that given cross-process-direction image-forming device pixel location, a width of that first mark; and determining an average width for the at least one first mark that is aligned with that given cross-process-direction image-forming device pixel location.

5. The method of claim 1, wherein generating, for each analyzed cross-process-direction image-forming device pixel location, for each analyzed gray level portion of that analyzed cross-process-direction image-forming device pixel location, at least one compensation parameter based on the determined actual gray level value and the intended gray level value for that analyzed gray level portion for that analyzed cross-process-direction image-forming device pixel location comprises generating, for each analyzed cross-process-direction image-forming device pixel location, a local tone reproduction curve for that analyzed cross-process-direction image-forming device pixel location based on the determined actual gray level value and the intended gray level value for that analyzed gray level portion for that analyzed cross-process-direction image-forming device pixel location.

6. The method of claim 5, wherein generating, for each analyzed cross-process-direction image-forming device pixel location, for each analyzed gray level portion of that analyzed cross-process-direction image-forming device pixel location, at least one compensation parameter based on the determined actual gray level value and the intended gray level value for that analyzed gray level portion for that analyzed cross-process-direction image-forming device pixel location further comprises associating a local tone reproduction curve with the determined width for the at least one first mark that is aligned with that cross-process-direction image-forming device pixel location.

7. The method of claim 6, further comprising:

printing only the plurality of rows of first marks;

determining, for each cross-process-direction image-forming device pixel location having at least one first mark in the printed plurality of rows of first marks that is aligned with that cross-process-direction image-forming device pixel location, a current width of that at least one aligned first mark;

determining, for each cross-process-direction image-forming device pixel location, a new local tone reproduction curve based on the determined current width of the at least one aligned first mark and the local tone reproduction curve that is associated with that width.

8. The method of claim 6, wherein associating the local tone reproduction curve with that determined width for the at least one first mark that is aligned with that cross-process-direction image-forming device pixel location comprises:

determining, for each of a plurality of widths, a local tone reproduction curve for that width;

dividing the plurality of widths into a number of groups, wherein, in each group, the widths are generally similar to each other and are generally dissimilar to the widths in the other groups; and determining, for each group, a range of associated widths and an associated characteristic local tone reproduction curve.

9. The method of claim 1, wherein analyzing the scanned image data based on the cross-process-direction scanned image pixel locations of the fiducial marks to determine at least one actual gray level value for at least one of the plurality of gray level portions for at least one cross-process-direction image-forming device pixel location comprises:

selecting one of the scanned image pixel locations as a current cross-process-direction scanned image pixel location;

selecting one of the plurality of gray level portions as a current gray level portion;

selecting, based on the current gray level portion, at least two rows of fiducial marks that are adjacent to the current gray level portion;

determining, based on the current scanned image cross-process-direction pixel location, at least one fiducial mark in each of the at least two rows of fiducial marks that is associated with the current cross-process-direction scanned image pixel location;

determining, for each of the determined fiducial marks associated with the current cross-process-direction scanned image pixel location, a centroid of that fiducial mark;

determining, for the cross-process-direction image-forming device pixel location associated with the selected cross-process-direction scanned image pixel location, the actual gray level value for the selected gray level portion of the associated cross-process-direction image-forming device pixel location based on the determined centroids of the associated fiducial marks.

10. The method of claim 9, wherein analyzing the scanned image data further comprises repeating the gray level portion selecting, the at least two rows of fiducial marks selecting, the at least one fiducial mark determining, the centroid determining and the actual gray level determining steps for each of the plurality of gray level portions.

11. The method of claim 10, wherein analyzing the scanned image data further comprises repeating the scanned image cross-process-direction pixel location selecting step.

12. The method of claim 9, further comprising:
determining, for each selected fiducial mark, an average gray level value for each cross-process-direction scanner pixel location along the cross-process direction associated with that fiducial mark;
developing an intensity vs. cross process position curve; and
identifying, for each fiducial mark, each side of that fiducial mark along the cross-process direction based on the intensity vs. cross process position curve and a determined threshold value;
wherein determining, for each of the selected fiducial marks, a centroid of that fiducial mark comprises determining a maximum value on the intensity vs. cross process position curve for that mark as the centroid of that mark.

13. The method of claim 9, wherein determining, for the cross-process-direction image-forming device pixel location associated with the selected cross-process-direction scanned image pixel location, the actual gray level value for the selected gray level portion of the associated cross-process-direction image-forming device pixel location based on the determined centroids of the at least two fiducial marks comprises determining the cross-position process-direction image-forming device pixel location that is associated with the selected cross-process-direction scanned image pixel location based on the locations of the determined centroid of least one of the at least two selected fiducial marks.

14. The method of claim 13, wherein determining, for the cross-process-direction image-forming device pixel location associated with the selected cross-process-direction scanned image pixel location, the actual gray level value for the selected gray level portion of the associated cross-process-direction image-forming device pixel location based on the determined centroid of the at least one fiducial mark comprises:

identifying, based on the at least one selected fiducial mark, the scanned image data pixels of the selected gray level portion associated with the selected cross-process-direction scanned image pixel location; and averaging the gray level values of the identified scanned image data pixels to generate the actual gray level value for the selected gray level portion for the selected cross-process-direction scanned image pixel location.

15. A storage medium storing a set of program instructions executable on a data processing device and usable to create data for compensating for streak defects in an image formed using an image forming device that forms the image on a receiving material that is translated through the image forming device along a process direction, the set of program instructions comprising:

instructions for printing a compensation pattern usable to determine a difference in gray level between an actual gray level value and an intended gray level value at a number of cross-process-direction image-forming device pixel locations in the image, comprising:

instructions for printing a plurality of gray level portions, each gray level portion extending along the cross-process direction and having an intended gray level that is different from that of the other gray level portions, the plurality of gray level portions arranged along the process direction, instructions for printing a plurality of rows of first marks, each row of first marks extending along the cross-process direction, wherein, for each cross-process-direction pixel location of the compensation pattern along the cross-process direction, there is a first mark in at least one of the rows of first marks that is aligned with that cross-process-direction pixel location, instructions for printing a first plurality of rows of fiducial marks, at least one pair of fiducial marks in each row being separated by a whitespace, each row of fiducial marks comprising a number of the fiducial marks that are spaced at a given interval along the cross-process direction, and instructions for printing a second plurality of rows of fiducial marks, at least one pair of fiducial marks in each row being separated by a whitespace, each row of fiducial marks comprising a number of the fiducial marks that are spaced at a given interval alone the cross-process direction, the plurality of gray level portions being between the first and second plurality of rows of fiducial marks;

instructions for scanning the printed compensation pattern to generate a set of scanned image data, the scanned image data defining an image value for each of a plurality of scanned image cross-process-direction pixel locations for at least one of the gray level portions and at least one of at least one row of first marks and at least one row of fiducial marks;

instructions for analyzing the scanned image data to determine at least one of a width for at least one first mark and at least one actual gray level value for at least one of the plurality of gray level portions for at least one cross-process-direction image-forming device pixel location based on a position in the scanned image pixel location of at least one fiducial in the scanned image data; and instructions for generating, for each analyzed cross-process-direction image-forming device pixel location, for each analyzed gray level portion of that analyzed cross-process-direction image-forming device pixel location, at least one compensation parameter based on the determined actual gray level value and the intended gray level value for that analyzed gray level portion for that analyzed cross-process-direction image-forming device pixel location.

16. The storage medium of claim 15, wherein:
the instructions for printing the plurality of gray level portions comprise instructions for printing the plurality of gray level portions so that the plurality of gray level portions are spaced from each other along the process direction such that a gap is provided between each pair of adjacent gray level portions; and
the instructions for printing the plurality of rows of fiducial marks comprise instructions for printing the plurality of rows of fiducial marks such that at least one row of fiducial marks is adjacent to each gray level portion.

17. The storage medium of claim 16, wherein the instructions for analyzing the scanned image data to determine at least one actual gray level value for at least one of the plurality of gray level portions for at least one cross-process-direction image-forming device pixel location based on a position in the scanned image pixel location of at least one fiducial mark comprise instructions for determining at least one actual gray level value for at least one of the plurality of gray level portions for at least one cross-process-direction image-forming device pixel location based on positions in the scanned image pixel location of fiducial marks in at least two rows of fiducial marks.

18. The storage medium of claim 15, wherein the instructions for determining the width of at least one first mark comprise:
instructions for determining, for a given cross-process-direction image-forming device pixel location, for each first mark that is aligned with that given cross-process-direction image-forming device pixel location, a width of that first mark; and
instructions for determining an average width for the at least one first mark that is aligned with that given cross-process-direction image-forming device pixel location.

19. The storage medium of claim 15, wherein the instructions for generating, for each analyzed cross-process-direction image-forming device pixel location, for each analyzed gray level portion of that analyzed cross-process-direction image-forming device pixel location, at least one compensation parameter based on the determined actual gray level value and the intended gray level value for that analyzed gray level portion for that analyzed cross-process-direction image-forming device pixel location comprise instructions for generating, for each analyzed cross-process-direction image-forming device pixel location, a local tone reproduction curve for that analyzed cross-process-direction image-forming device pixel location based on the determined actual gray level value and the intended gray level value for that analyzed gray level portion for that analyzed cross-process-direction image-forming device pixel location.

20. The storage medium of claim 19, wherein the instructions for generating, for each analyzed cross-process-direction image-forming device pixel location, for each analyzed gray level portion of that analyzed cross-process-direction image-forming device pixel location, at least one compensation parameter based on the determined actual gray level value and the intended gray level value for that analyzed gray level portion for that analyzed cross-process-direction image-forming device pixel location further comprise instructions for associating a local tone reproduction curve with the determined width for the at least one first mark that is aligned with that cross-process-direction image-forming device pixel location.

21. The storage medium of claim 20, further comprising:
instructions for printing only the plurality of rows of first marks;
instructions for determining, for each cross-process-direction image-forming device pixel location having at least one first mark in the printed plurality of rows of first marks that is aligned with that cross-process-direction image-forming device pixel location, a current width of that at least one aligned first mark;
instructions for determining, for each cross-process-direction image-forming device pixel location, a new local tone reproduction curve based on the determined current width of the at least one aligned first mark and the local tone reproduction curve that is associated with that width.

22. The storage medium of claim 20, wherein the instructions for associating the local tone reproduction curve with that determined width for the at least one first mark that is aligned with that cross-process-direction image-forming device pixel location comprise:
instructions for determining, for each of a plurality of widths, a local tone reproduction curve for that width;
instructions for dividing the plurality of widths into a number of groups, wherein, in each group, the widths are generally similar to each other and are generally dissimilar to the widths in the other groups; and
instructions for determining, for each group, a range of associated widths and an associated characteristic local tone reproduction curve.

23. The storage medium of claim 15, wherein the instructions for analyzing the scanned image data based on the cross-process-direction scanned image pixel locations of the fiducial marks to determine at least one actual gray level value for at least one of the plurality of gray level portions for at least one cross-process-direction image-forming device pixel location comprise:
instructions for selecting one of the scanned image pixel locations as a current cross-process-direction scanned image pixel location;
instructions for selecting one of the plurality of gray level portions as a current gray level portion;
instructions for selecting, based on the current gray level portion, at least two rows of fiducial marks that are adjacent to the current gray level portion;
instructions for determining, based on the current scanned image cross-process-direction pixel location, at least one fiducial mark in each of the at least two rows of fiducial marks that is associated with the current cross-process-direction scanned image pixel location;
instructions for determining, for each of the determined fiducial marks associated with the current cross-process-direction scanned image pixel location, a centroid of that fiducial mark;
instructions for determining, for the cross-process-direction image-forming device pixel location associated with the selected cross-process-direction scanned image pixel location, the actual gray level value for the selected gray level portion of the associated cross-process-direction image-forming device pixel location based on the determined centroids of the associated fiducial marks.

24. The storage medium of claim 23, wherein the instructions for analyzing the scanned image data further comprise instructions for repeating the gray level portion selecting, the at least two rows of fiducial marks selecting, the at least one fiducial mark determining, the centroid determining and the actual gray level determining instructions for each of the plurality of gray level portions.

25. The storage medium of claim 24, wherein the instructions for analyzing the scanned image data further comprise instructions for repeating the scanned image cross-process-direction pixel location selecting instructions.

26. The storage medium of claim 23, further comprising:
instructions for determining, for each selected fiducial mark, an average gray level value for each cross-process-direction scanner pixel location along the cross-process direction associated with that fiducial mark;
instructions for developing an intensity vs. cross process position curve; and
instructions for identifying, for each fiducial mark, each side of that fiducial mark along the cross-process direction based on the intensity vs. cross process position curve and a determined threshold value;
wherein the instructions for determining, for each of the selected fiducial marks, a centroid of that fiducial mark comprise instructions for determining a maximum value on the intensity vs. cross process position curve for that mark as the centroid of that mark.

27. The storage medium of claim 26, wherein the instructions for determining, for the cross-process-direction image-forming device pixel location associated with the selected cross-process-direction scanned image pixel location, the actual gray level value for the selected gray level portion of the associated cross-process-direction image-forming device pixel location based on the determined centroids of the at least two fiducial marks comprise instructions for determining the cross-position process-direction image-forming device pixel location that is associated with the selected cross-process-direction scanned image pixel location based on the locations of the determined centroid of least one of the at least two selected fiducial marks.

28. The storage medium of claim 27, wherein the instructions for determining, for the cross-process-direction image-forming device pixel location associated with the selected cross-process-direction scanned image pixel location, the actual gray level value for the selected gray level portion of the associated cross-process-direction image-forming device pixel location based on the determined centroid of the at least one fiducial mark comprise:
instructions for identifying, based on the at least one selected fiducial mark, the scanned image data pixels of the selected gray level portion associated with the selected cross-process-direction scanned image pixel location; and
instructions for averaging the gray level values of the identified scanned image data pixels to generate the actual gray level value for the selected gray level portion for the selected cross-process-direction scanned image pixel location.

29. A method for printing a compensation pattern usable to generate compensation information that compensates for streak defects in an image formed using an image forming device that forms the image on a receiving material that is translated through the image forming device along a process direction, the compensation pattern comprising:
printing a plurality of gray level portions, each gray level portion extending along the cross-process direction and having an intended gray level that is different from that of the other gray level portions, the plurality of gray level portions arranged along the process direction;
printing a plurality of rows of first marks, each row of first marks extending along the cross-process direction, wherein, for each cross-process-direction pixel location of the compensation pattern along the cross-process direction, there is a first mark in at least one of the rows of first marks that is aligned with that cross-process-direction pixel location;
printing a first plurality of rows of fiducial marks, at least one pair of fiducial marks in each row being separated by a whitespace, each row of fiducial marks comprising a number of the fiducial marks that are spaced at a given interval along the cross-process direction; and
printing a second plurality of rows of fiducial marks, at least one pair of fiducial marks in each row being separated by a whitespace, each row of fiducial marks comprising a number of the fiducial marks that are spaced at a given interval along the cross-process direction, the plurality of gray level portions being between the first and second plurality of rows of fiducial marks.

30. The method of printing a compensation pattern of claim 29, wherein:
the plurality of gray level portions are spaced from each other along the process direction such that a gap is provided between each pair of adjacent gray level portions; and
the plurality of rows of fiducial marks are arranged such that at least one row of fiducial marks is adjacent to each gray level portion.

31. The method for printing a compensation pattern of claim 30, wherein each of the plurality of rows of first marks contains a number of first marks, each first mark aligned with one of the cross-process-direction pixel locations of the compensation pattern and having a width corresponding to a width of the cross-process-direction pixel location.

32. The method for printing a compensation pattern of claim 31, wherein, in each of the plurality of rows of first marks, the first marks of that row are at least pseudo-randomly distributed along the cross-process direction.

33. The method for printing a compensation pattern of claim 31, wherein, for at least one cross-process-direction pixel location of the compensation pattern, there is an aligned first mark in each of at least two of the rows of first marks.

34. The method for printing a compensation pattern of claim 29, wherein, in each of the plurality of rows of fiducial marks, the given interval corresponds to a defined number of cross-process-direction pixel locations.

* * * * *